United States Patent
Rujan

(10) Patent No.: US 9,396,421 B2
(45) Date of Patent: Jul. 19, 2016

(54) PRODUCING, CAPTURING AND USING VISUAL IDENTIFICATION TAGS FOR MOVING OBJECTS

(75) Inventor: Pal Rujan, Freiburg (DE)

(73) Assignee: Rujan Entwicklung und Forschung GmbH, Freiburg (DE)

( * ) Notice: Subject to any disclaimer, the term of this patent is extended or adjusted under 35 U.S.C. 154(b) by 1055 days.

(21) Appl. No.: 13/206,977

(22) Filed: Aug. 10, 2011

(65) Prior Publication Data

US 2012/0039529 A1 Feb. 16, 2012

Related U.S. Application Data

(60) Provisional application No. 61/373,804, filed on Aug. 14, 2010.

(51) Int. Cl.
  *G06K 9/00* (2006.01)
  *G06K 19/06* (2006.01)
  *G06K 7/14* (2006.01)

(52) U.S. Cl.
  CPC ........ *G06K 19/06037* (2013.01); *G06K 7/1417* (2013.01); *G06K 7/1473* (2013.01); *G06K 19/06046* (2013.01)

(58) Field of Classification Search
  None
  See application file for complete search history.

(56) References Cited

U.S. PATENT DOCUMENTS

| | | | |
|---|---|---|---|
| 2,632,058 A | 3/1953 | Gray | |
| 4,063,736 A | 12/1977 | Robinson | |
| 4,874,936 A * | 10/1989 | Chandler et al. | ............. 235/494 |
| 4,896,029 A | 1/1990 | Chandler et al. | |
| 4,998,010 A | 3/1991 | Chandler et al. | |
| 5,621,203 A | 4/1997 | Swartz et al. | |
| 6,053,407 A | 4/2000 | Wang et al. | |
| 6,070,805 A * | 6/2000 | Kaufman et al. | ............. 235/494 |
| 6,601,772 B1 | 8/2003 | Rubin et al. | |
| 7,032,823 B2 | 4/2006 | Nojiri | |
| 7,400,332 B2 | 7/2008 | Schweng et al. | |
| 7,936,901 B2 | 5/2011 | Jancke | |
| 7,942,340 B2 | 5/2011 | Uchiyama et al. | |
| 8,571,306 B2 | 10/2013 | Reznik et al. | |
| 2004/0128687 A1 | 7/2004 | Chun | |
| 2005/0194445 A1 | 9/2005 | Takakura et al. | |
| 2006/0097062 A1 | 5/2006 | Cheong et al. | |

(Continued)

FOREIGN PATENT DOCUMENTS

| | | |
|---|---|---|
| EP | 1143372 A2 | 10/2001 |
| EP | 0653720 B1 | 9/2002 |

(Continued)

OTHER PUBLICATIONS

F. Y. Wu: The Potts model, Reviews of Modern Physics, Vo. 54, pp. 235-268. This is a review about the statistical mecahnical models generalizing the graph color problem. See corresponding entry there. Difficult to read without previous knowledge.

(Continued)

*Primary Examiner* — Atiba O Fitzpatrick

(74) *Attorney, Agent, or Firm* — Schwegman Lundberg & Woessner, P.A.

(57) ABSTRACT

A visual Reference tag is formed from an array of cells, wherein each cell is visually distinct from all other cells in a given neighborhood and each of said cells contains a single visual cue, for example a unique color, selected from a finite number of visual cues.

1 Claim, 19 Drawing Sheets
(16 of 19 Drawing Sheet(s) Filed in Color)

(56) References Cited

U.S. PATENT DOCUMENTS

| | | |
|---|---|---|
| 2007/0051813 A1 | 3/2007 | Kiuchi |
| 2007/0285433 A1 | 12/2007 | Wu |
| 2009/0230193 A1 | 9/2009 | Al-Hussein |
| 2013/0098982 A1 | 4/2013 | Adams |

FOREIGN PATENT DOCUMENTS

| | | |
|---|---|---|
| EP | 1791076 A2 | 5/2007 |
| EP | 2603880 A1 | 6/2013 |
| WO | WO-2012/022678 A1 | 2/2012 |

OTHER PUBLICATIONS

P. Rujan, Storage Capacity of Visual Reference Tags, REF/2011/11/29 (REF Journal) (reftags.pdf) This contains the exact calculation of the visual reference tags's storage capacity for an arbitrary number of colors > 5. Uses analytic and symbolic manipulation methods going well beyond the patent application.

"European Application Serial No. 11757789.0, Examination Notification Art. 94(3) mailed Aug. 4, 2014", 4 pgs.

"European Application Serial No. 11757789.0, Office Action mailed Mar. 21, 2013", 2 pgs.

"International Application Serial No. PCT/EP2011/063895, International Preliminary Report on Patentability mailed Feb. 28, 2013", 8 pgs.

"International Application Serial No. PCT/EP2011/063895, International Search Report mailed Nov. 21, 2011", 3 pgs.

"International Application Serial No. PCT/EP2011/063895, Written Opinion mailed Nov. 21, 2011", 6 pgs.

U.S. Appl. No. 14/745,750, Non Final Office Action mailed Oct. 30, 2015, 15 pgs.

U.S. Appl. No. 14/745,750, Response filed Nov. 30, 2015 to Non Final Office Action mailed Oct. 30, 2015, 14 pgs.

\* cited by examiner

PRODUCING, CAPTURING AND USING VISUAL IDENTIFICATION TAGS FOR MOVING OBJECTS

This application claims benefit of provisional patent application 61/373,804, filed Aug. 14, 2010. This patent or application file contains at least one drawing and photograph executed in color. Copies of this patent or patent application publication with color drawing(s) will be provided by the Office upon request and payment of necessary fee.

BACKGROUND OF THE INVENTION

This invention relates to producing, capturing and using visual identification tags for moving objects. More particularly, this invention addresses the need to identify one or more moving objects with the help of a standard digital camera, like a web-camera or video-frames of a mobile phone camera.

A bar code contains information represented by a linear series of spaced lines, wherein the width of the lines and spacing there between varies. The code can be scanned to retrieve information represented by the spacing. A problem associated with bar codes is that they are difficult to read at a distance, and can hold only a rather limited amount of information. In addition, they must be oriented properly in order to be read by a scanner. Two-dimensional barcodes or matrix codes contain a greater amount of information but are even more difficult to read and align.

Closest to the present invention are the "MaxiCode" matrix code used by UPS Ref. 1) it uses black and white hexagons— and Microsoft's high capacity color barcode Ref. 2), which uses colored triangles as optical coding units. Capturing known 2D matrix codes with a low resolution digital camera fails under changing illumination conditions or when the target is too distant. None of these codes is able to identify reliably a variable number of tags present at the same time in a moving camera's visual field.

FIG. 1 illustrates two commonly used 2D matrix codes. The Data Matrix on the left and QR (Ref. 3) on the right code the Assignee name and address, as in the front page of this application. Note the typical anchors, here squares, which are used to register (move into standard position, or acquire) the tags. The anchors are found using template matching.

FIG. 2 illustrates the UPS "MaxiCode" for the same string as in FIG. 1. The use of black and white hexagons allows for a more economical use of space. The "Bull-Eye" anchor is used for locating and registering the tag. Note the white space between two adjacent black hexagons, used for segmentation.

FIG. 3 illustrates the Microsoft high density color tags in {Black, Yellow, Cyan, Magenta} space (2 bits per triangle). The white spaces between successive rows are used for deskewing and alignment and are an integral part of that invention. The tags can be generated and stored on a Microsoft dedicated web server. For details and capture instructions sec Ref. 4).

The storage capacity of the disclosed type of visual reference tags is necessarily restricted by the fact that the tags must be relatively large, so that they can be captured reliably from a distance and in arbitrary rotational position. Among the exemplary embodiments disclosed herein, the storage capacity changes between 8 and 139 bits for rotational invariant codes. In this respect, visual reference tags face issues similar to RFID tags and can use similar techniques for extending their information content through additional external annotation. RFID tags and in particular their support systems are quite expensive and are often used for controlling or monitoring purposes.

In contrast, visual reference tags according to this invention do not require new infrastructure except software and network access: they can be printed on standard color printers, displayed occasionally, and captured through the low resolution video stream of any standard digital camera.

Consider a meeting where the participants wear their name tags. Name tags and visit cards are difficult to read reliably by mobile devices, partly because optical character recognition (OCR) uses computational resources heavily. Using RFID's, smart cards, and similar electronic devices requires additional equipment and might be considered privacy intrusive. Wearing a visual reference tag as disclosed in this invention, however, makes possible an easy and reliable recognition of participants, allows for automating conference services, and much more. Visual identification tags could provide information on demand at art and industrial exhibitions, service official and private parties, automate the identification of service personnel using the same weighing scale, cash registers copiers, and the like in the retail and service sector, improve surveillance and/or robot tracking systems, etc.

The current invention is based on a systematic analysis of all relevant issues concerning the effective recognition of visual symbols. Hence, the design of visual reference tags reflects the optimal image processing and machine learning methods needed to identify them. The most important innovations are: 1) the use of graph coloring strategy to enhance region identification and 2) the use of volume based visual cues for robust target acquisition based on a hue histogram matching. As a result, the tags can be identified at different resolution levels in only one sweep through the image. The system robustness is further increased by automatic color calibration, learning from examples, and run-time adaptation.

The invention discloses a method, a system, and products related to visual reference tags for tagging and subsequently identifying moving objects using low resolution digital cameras, typically a web-camera or a mobile phone digital camera. It discusses exemplarily a family of visual reference (REF) tags, in increasing order of size and information capacity. Different applications, like for instance coding a GPS coordinate and using the visual tags to navigate subway stations, supermarkets, etc., can make thus an optimal choice of which REF tag to use, larger reference tags coding more information but being more difficult to decode. If appropriate error correcting codes are included, the size of the tag is bounded in practice by the capture device resolution and the expected maximal number of tagged objects in its visual field.

SUMMARY OF THE INVENTION

This invention enables one to identify one or more objects with the help of a standard digital camera, like a web-camera or video-frames of a mobile phone camera through machine readable signs posted by these objects or persons, providing thus a ubiquitous realization of the augmented reality concept.

The invention provides methods, apparatus, processes, and usage application cases based on a new class of visual reference (REF) tags. Standard REF tags consist of a central hexagonal cell surrounded by one or more layers of regular hexagons. The hexagons are colored subject to extended graph coloring rules. The used colors depend on the optical spectrum of the light sensor and are dividing equally the color angle (hue) and the gray channel as realized by the capture device. The invention discloses a method of generating the tag's colors from input data of predefined maximal size, and the inverse method of generating the original data from the tag's colors, so that the data is not changed by arbitrary rotations of the visual tag.

The tag design makes use of a new probabilistic signal decoding strategy based on parallel multi-scale frequency counts. An optimal and efficient method to do so is disclosed, performing an accurate identification and decoding of none, one, or several tags in one pass through the image. Furthermore, I disclose a system allowing the decoder to learn distortions introduced by the printing and capture devices and adapt to changing illumination conditions during run-time.

Badges displaying REF tags can be produced on standard color printers. One or more (or one from more) objects or persons wearing these badges can be identified reliably by such common digital capture devices like mobile phone cameras in video-mode, even from a distance and under poor illumination conditions, and even as the said objects/persons and the capture device(s) are moving relative to each other. Last but not least, REF tags are highly aesthetic. In one preferred embodiment the present invention is using a tag consisting of a central hexagon surrounded by one or more layers of surrounding hexagons. The hexagons are colored subject to exclusion rules generalizing the graph coloring problem.

These and other objects are attained by a producing, capturing and using visual identification tags for moving objects as described below.

BRIEF DESCRIPTION OF THE DRAWINGS

In the accompanying drawings.

Figure 6:
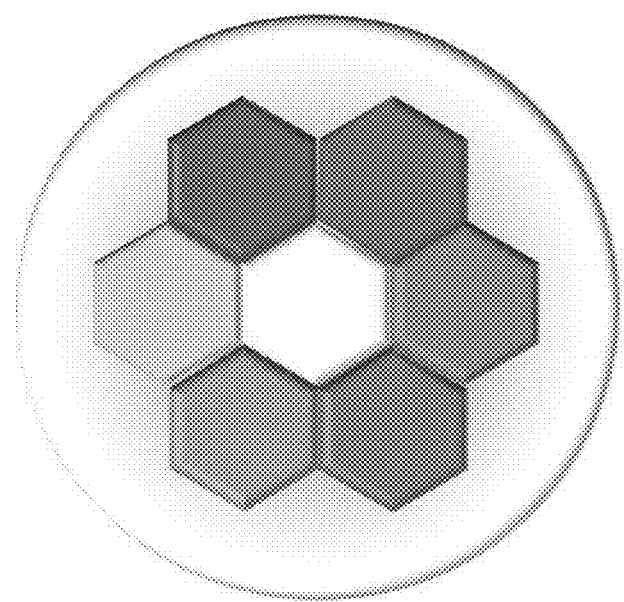
FIG. 6 illustrates a core visual reference tag. Real colors can be used only once, the center is black or white.
Figure 6:
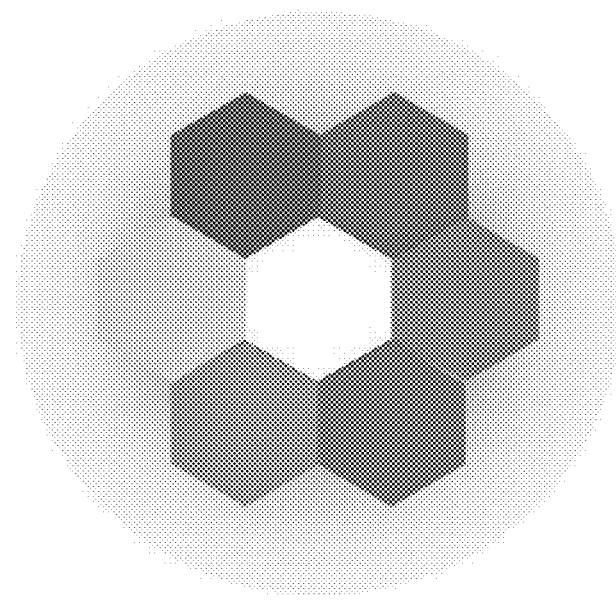

The TABLE 1 lists the information storage capacity of the visual reference tags of core A and Core B of FIG. 6, in bits.

Figure 10A:
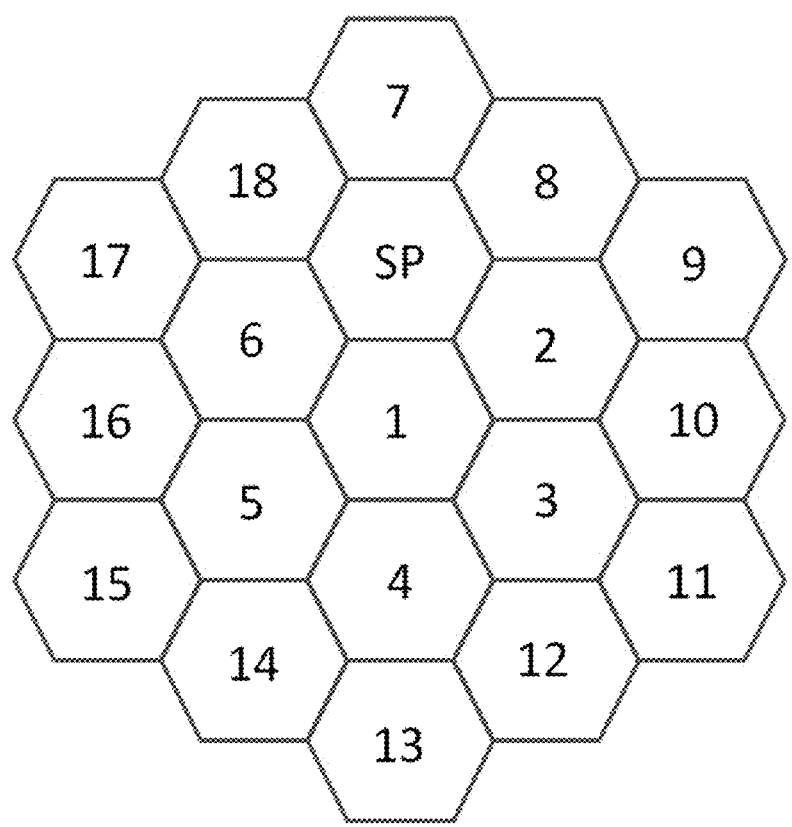

The TABLE 2 displays the variable number of digits along the encoding path of FIG. 10*a* and the number of possible different colorings.

FIG. 10*a* illustrates the standard encoding path EP.

Figure 10B:
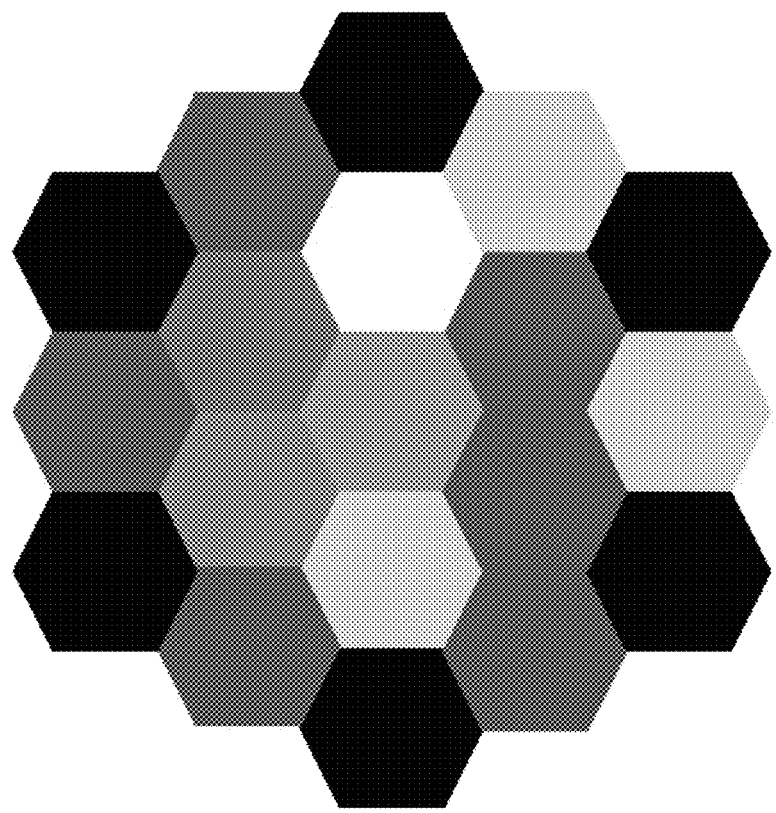

FIG. 10*b* shows the coloring corresponding to the decimal number 127.

Figure 10C:
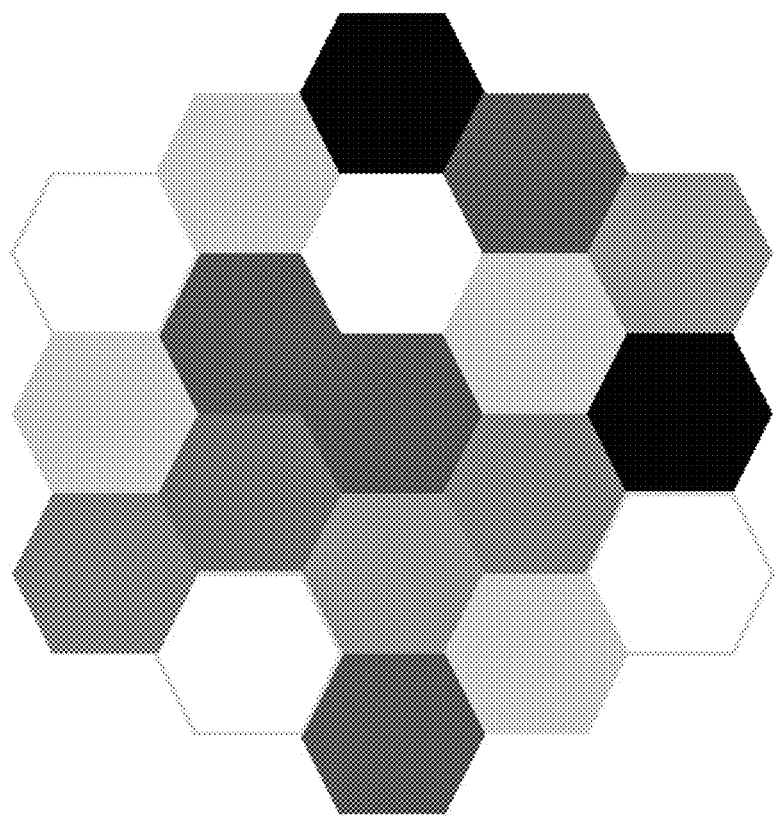

FIG. 10*c* illustrates the effect of the aesthetic shift.

The TABLE 3 contains the detailed calculations for generating the colors in FIG. 10*b*.

Figure 11:
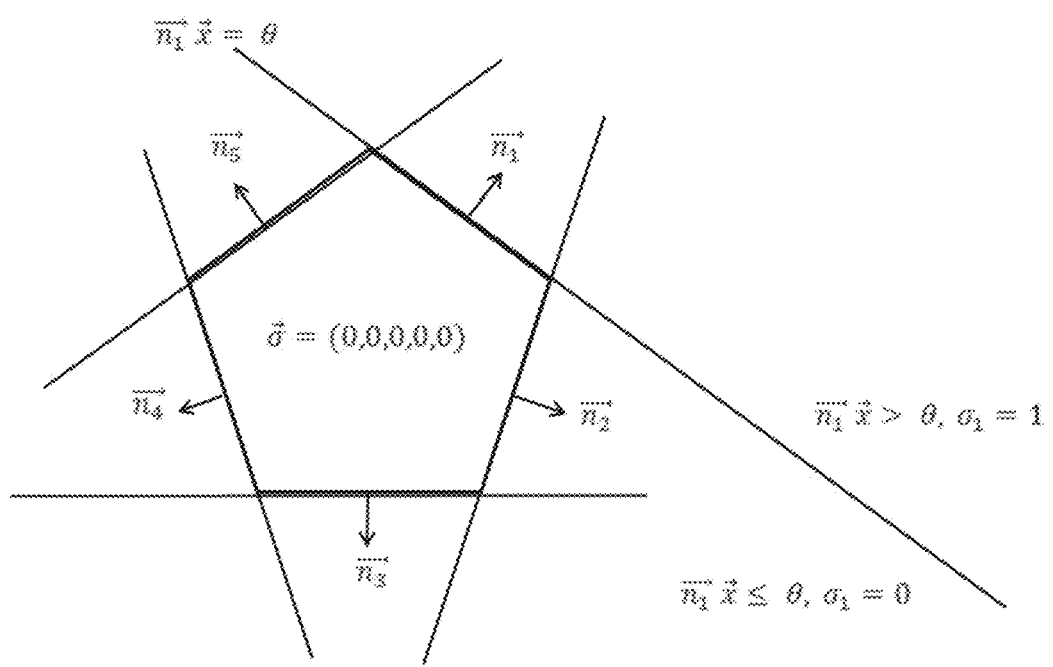

FIG. 11 illustrates a computational geometric method for counting pixel based histograms.

Figure 12:
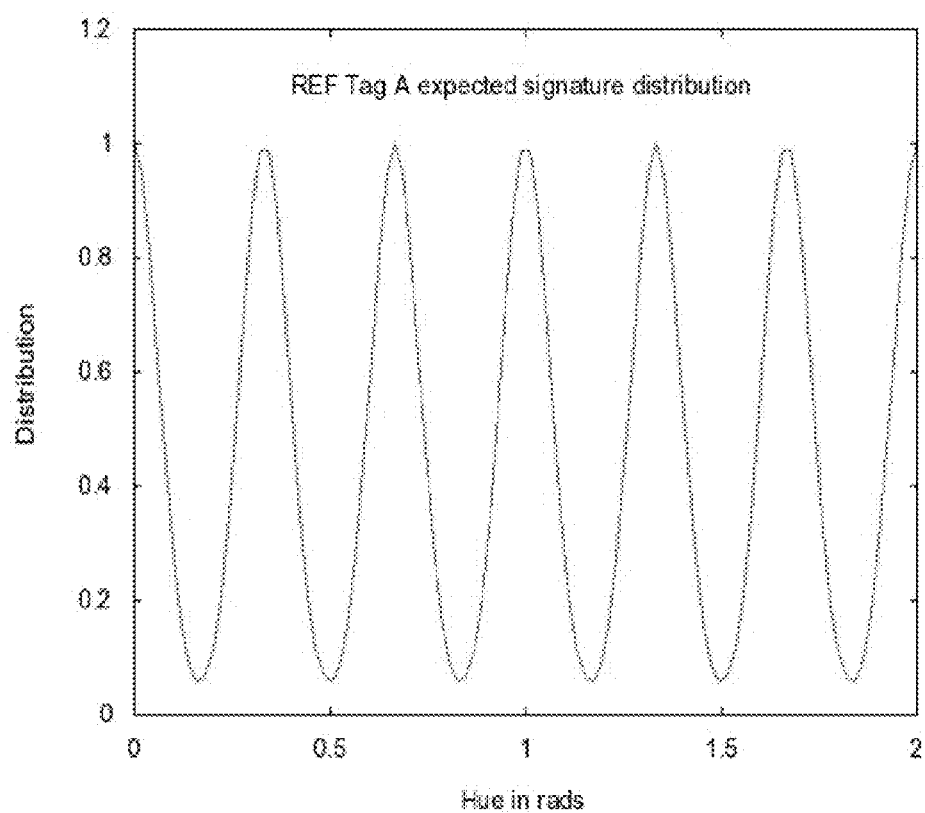

FIG. 12 illustrates the expected hue distribution for the reference tag signature, independently of the actually coded information.

Figure 13:

FIG. 13 shows some examples of recognized tags against different backgrounds.

Figure 14:
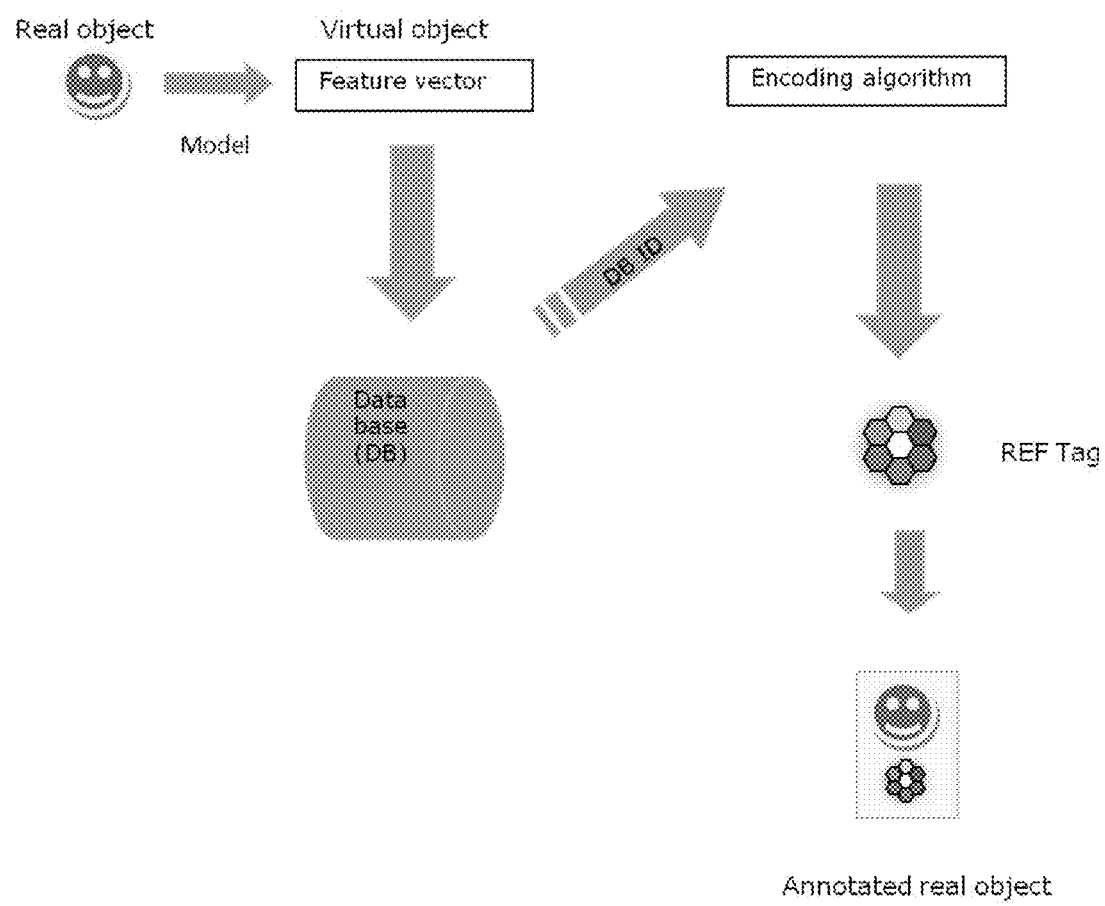

FIG. 14 illustrates a process for annotating a real object.

Figure 15:
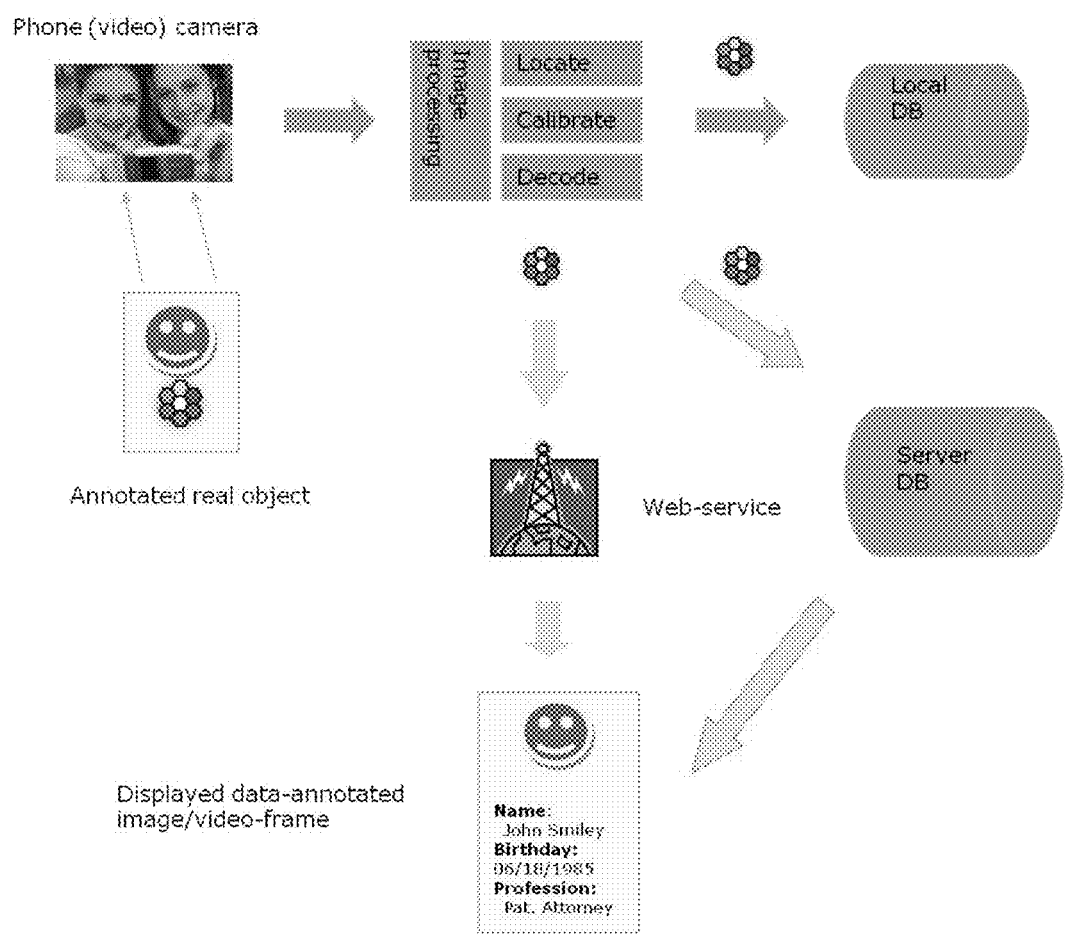

FIG. 15 illustrates an example of reading object annotations.

Figure 16:
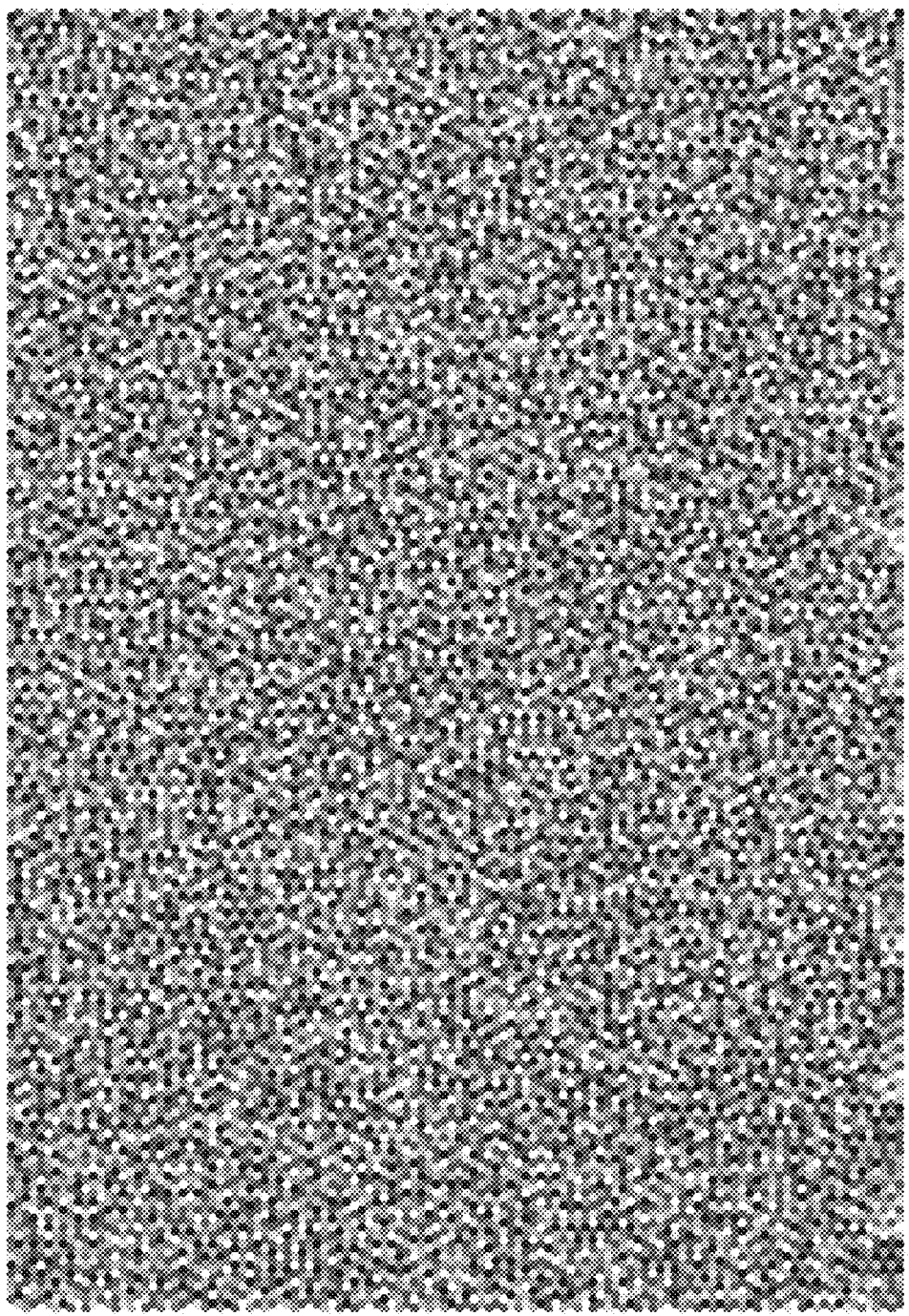

FIG. 16 illustrates the use of the disclosed encoding and decoding methods for storing text information in machine readable format for document management purposes.

DESCRIPTION OF THE PREFERRED EMBODIMENT

As shown in FIG. 10*b*, a reference Tag 2 (REF Tag 2), contains a central hexagon surrounded by two layers of identical hexagons. This tag has a capacity of up to 39 bits when the coding is rotationally invariant. As a comparison, a full longitude-latitude co-ordinate pair requires only 21 bits. The hexagons are regular: if the hexagon side is A, then its height is $A\sqrt{3}$. The used colors are black, Red, Yellow, Green, Cyan, Blue, Magenta, and white, in this order.

Figure 3:
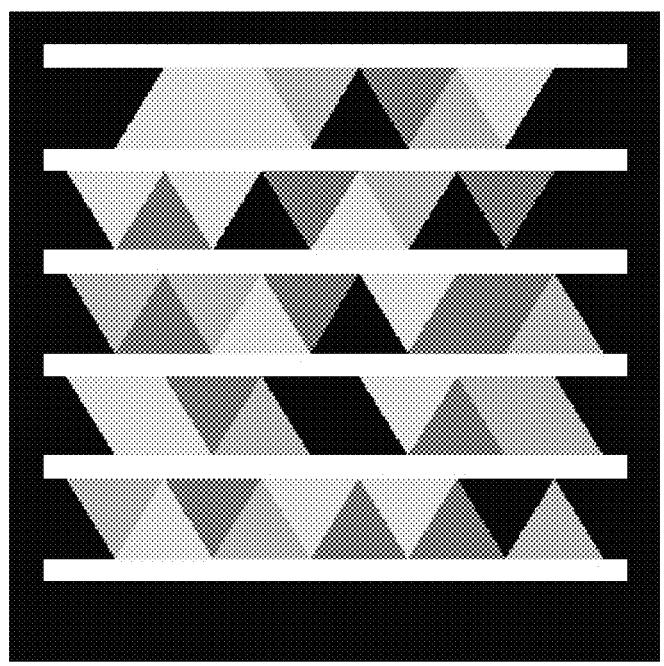
FIG. 3 illustrates the Microsoft high density color tags.
Figure 3A:
FIG. 3*a* illustrates an embodiment of the visual reference A Tag.

FIG. 3*a* illustrates a somewhat unusual physical embodiment of the visual reference A Tag. This is a real life photograph showing the projection of dichroic filtered colors by a "Dolce Vita" Oligo halogen lamp, Ref. 5), in the inventor's flat. Note that the Cyan filter is missing. The filters could be switched manually so as to share one of the 5!=120 secret messages, for example.

Figure 5:
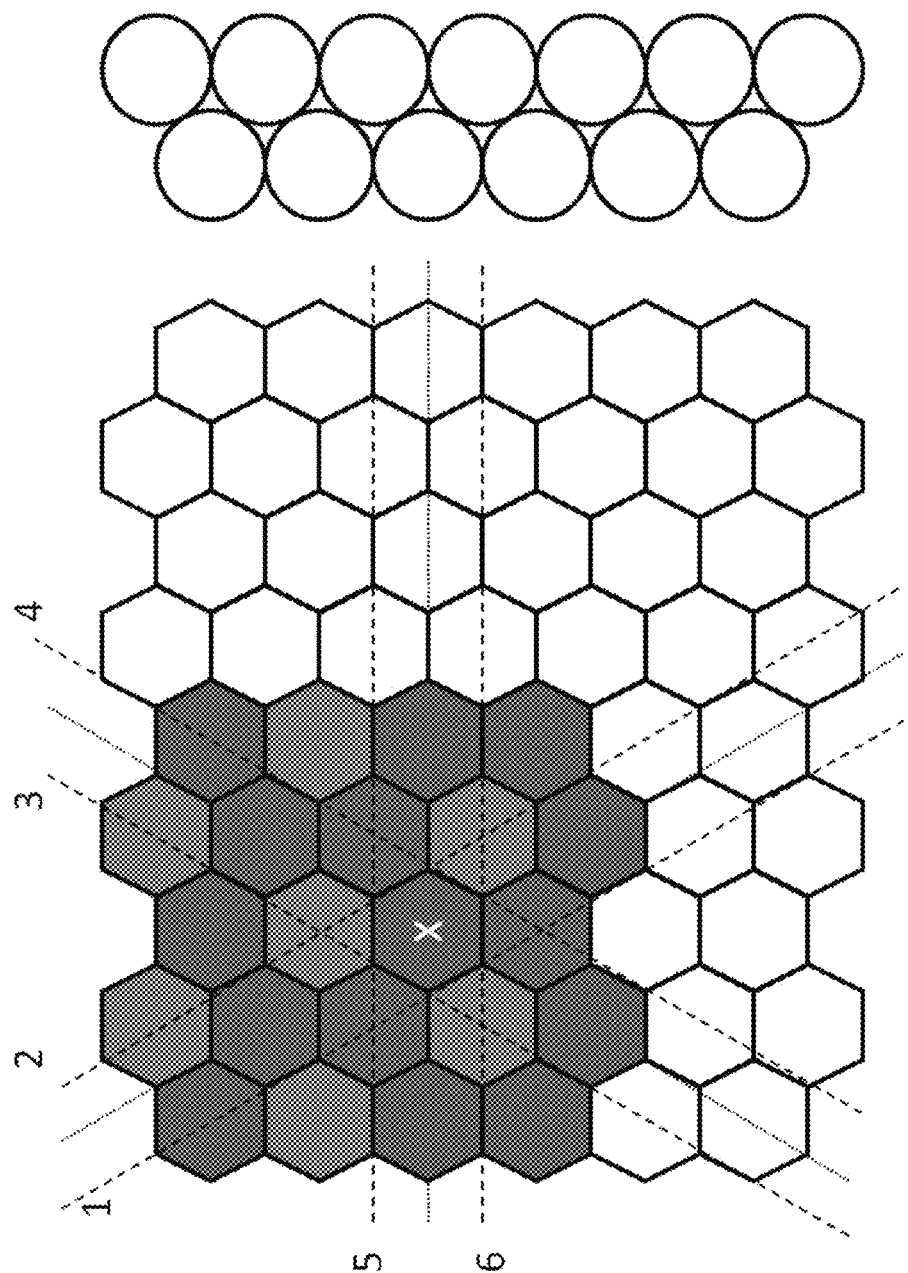
FIG. 5 illustrates how close-packing the plane with circles of a given radius (right) is well approximated by the honeycomb lattice shown on the left side.

FIG. 5 illustrates how covering the plane with circles of a given radius (right) is well approximated by the honeycomb lattice shown on the left side. A point belongs to the blue hexagon denoted by X if it falls between the lines (1,2), (3,4), and (5,6).

FIG. 6 illustrates the core Tag A. The Figure has about the real size of a badge, shown schematically on the right. A neutral gray background is recommended. If the black/white centre is moved to the top, a rotational invariant tag can carry up to 10 bits. These asymmetric tags are denoted as "core B" tags. Both tags have a perfect hue signature reflecting the displayed six equidistant colors.

Figure 7:
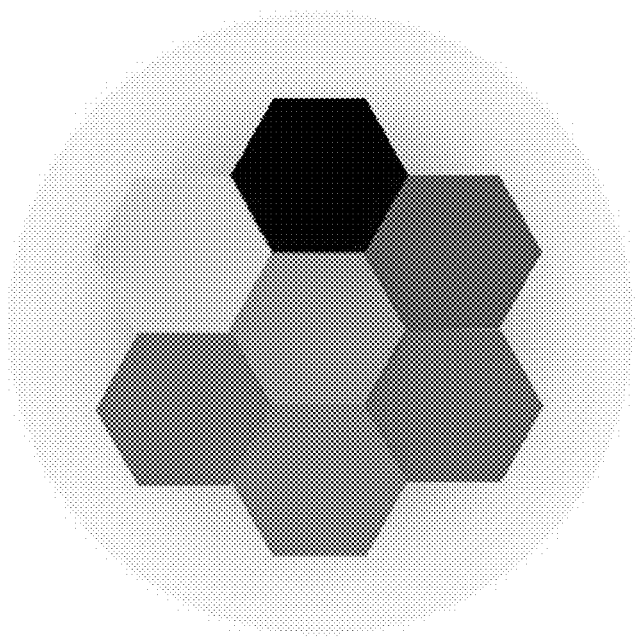
FIG. 7 illustrates an alternative core visual reference tag. The black hexagon is also the starting point when reading the tag.

FIG. 7 illustrates the core Tag B: the outer white hexagon is used for both white compensation and as starting point when using rotational invariant coding. Its capacity is 10 bits.

Figure 8:
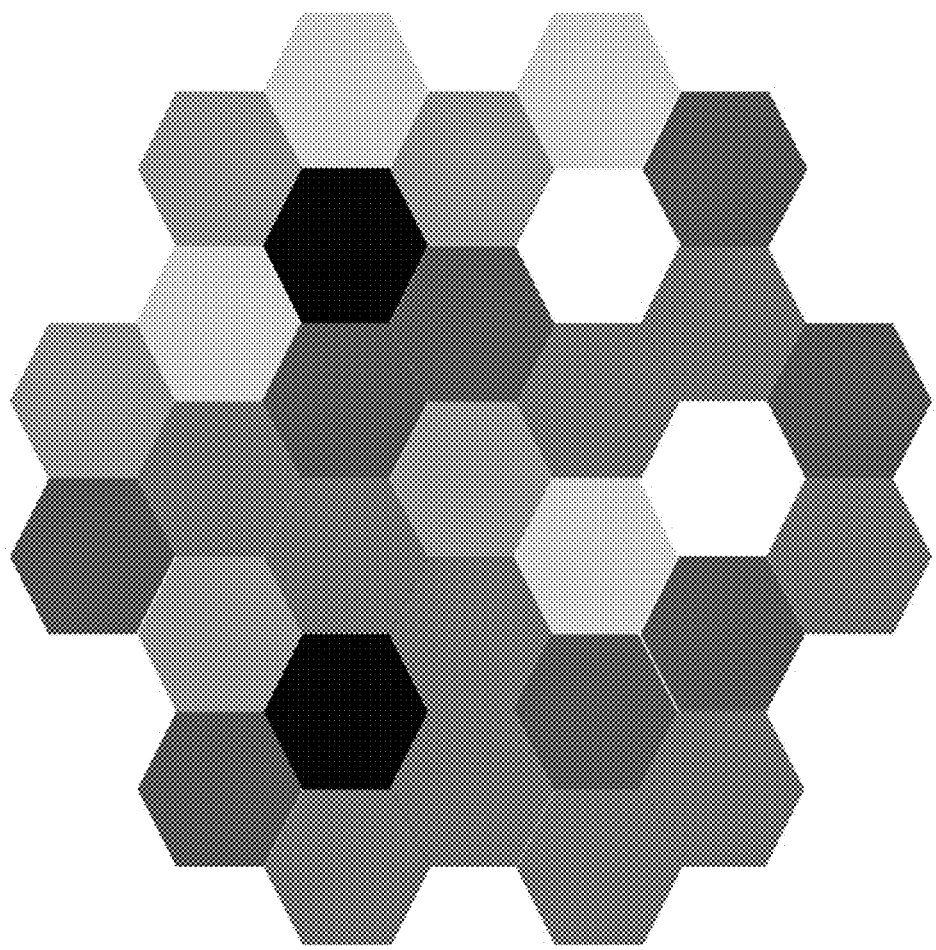
FIG. 8 illustrates a three layer visual reference tag. The second and third layer follow the map coloring rules.
Figure 9:
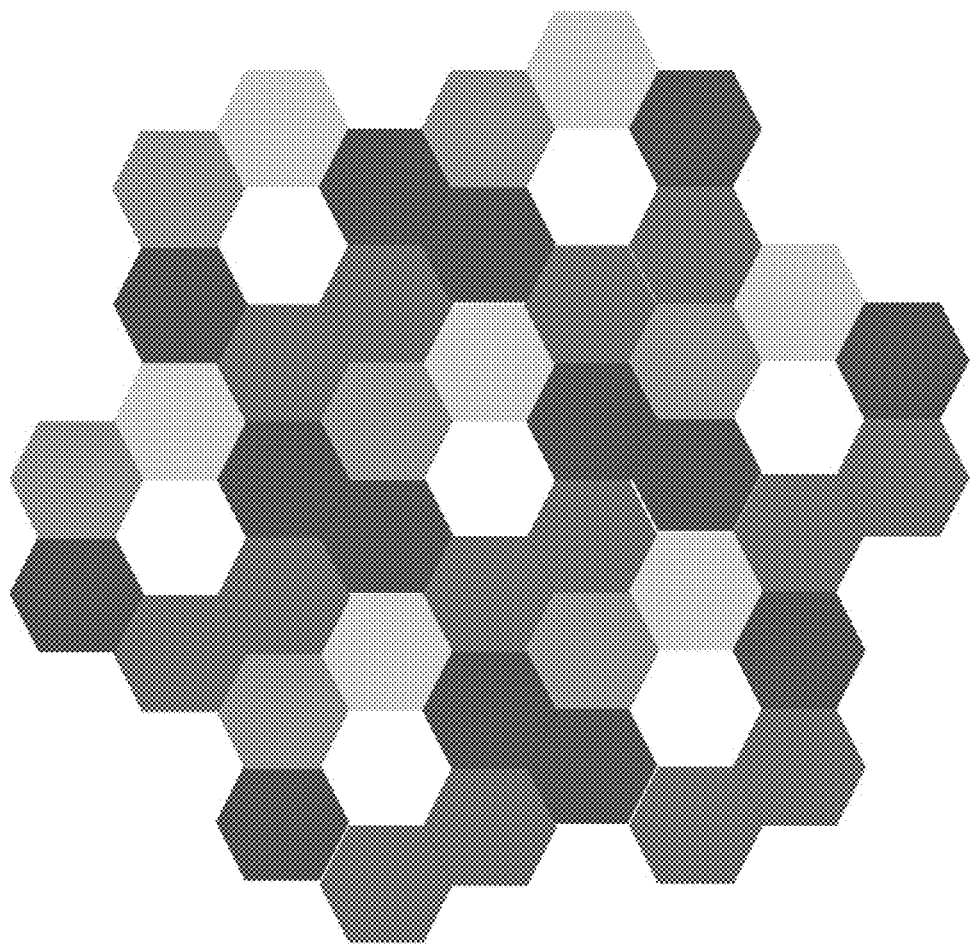
FIG. 9 illustrates a cluster obtained by repeating the core tag.

FIG. 8 illustrates the REF Tag 3 with 2 additional layers surrounding the tag's core, also obeying map coloring rules FIG. 9 illustrates the REF Cluster (1) Tag obtained by iterating once the core tag. The original colors are repeated to make clear the iteration procedure.

FIG. 10*b* illustrates the REF Tag 2. The outer shell hexagons obey map coloring: they must differ (in color) from their neighbors.

TABLE 1 below contains the tight estimate of storage capacity for the visual reference tags disclosed by this invention, in bits. Both cores A and B define a rotationally invariant code. The bolded entries are recommended tags.

TABLE 1

|  |  | REF Tag | | | | |
| --- | --- | --- | --- | --- | --- | --- |
|  |  | A | B | 2 | 3 | Cluster[1] |
| Core | A | 8 | — | 37 | 66 | 137 |
|  | B | — | 10 | 39 | 68 | 139 |

TABLE 2 shows the variable number of "color digits" along the path enumerated in FIG. 10a. m=0 corresponds to the starting point (SP) and $Q_m = \Pi_{k=0}^{m-1} q_k$, m>0; $Q_0=1$ is the number multiplying the "color digit" $a_m \in [0, \ldots, q_{m-1}]$, as described in the Appendix. The values recorded in the table reflect the "single path approximations" discussed there.

TABLE 2

| | | | | | | m | | | | | | | |
|---|---|---|---|---|---|---|---|---|---|---|---|---|---|
| | 0 | 1 | 2 | 3 | 4 | 5 | 6 | 7 | 8 | 9 | 10 | 11 | 12 |
| $q_m$ | 2 | 6 | 5 | 4 | 3 | 2 | 1 | 7 | 6 | 5 | 6 | 5 | 6 |
| $Q_m$ | 1 | 2 | 12 | 60 | 240 | 720 | 1440 | 10080 | 60480 | 302400 | 1814400 | 9072000 | 54432000 |

| | | m | | | | |
|---|---|---|---|---|---|---|
| | 13 | 14 | 15 | 16 | 17 | 18 |
| $q_m$ | 5 | 6 | 5 | 6 | 5 | 4 |
| $Q_m$ | 272160000 | 1632960000 | 8164800000 | 48988800000 | 244944000000 | 979776000000 |

FIG. 10a illustrates the standard encoding path EP. SP is the path starting point, or zero point. When the tag is rotated, SP can be identified by finding the sole black or white hexagon in the first layer. Counting all possible color distributions along EP is a difficult mathematical (graph-coloring) problem, as explained in the Appendix.

FIG. 10b shows the code corresponding to the number $127 = Q_0 + 3Q_1 + 2Q_3$. The {black, Red} colors repeat themselves often because they are at the top of the list of available colors (in sRGB order). See TABLE 3 for detailed calculations.

FIG. 10c illustrates the effect of the "aesthetic shift": before each color choice one skips automatically m colors before counting the additional skips provided by the corresponding "color digit". If the end of available colors is reached, the count continues from the beginning of the list.

TABLE 3 exemplifies how to code 127 into the colors of FIG. 10b. First, consult TABLE 2 and enter in the SKIP column the appropriate "color digits". In following the encoding path, write down in the next table row the already existing colors influencing the actual choice. For the first 7 hexagons each color can be chosen only once (the core rule). In the second layer only already colored nearest neighbors must be excluded from the available color list. Excluded colors's columns are shaded.

For the SP=0 hexagon in FIG. 10a select either black or white. Since $Q_1=2$ and 127 is odd, its color digit for $a_0$ is 1, so skip ('>') black and choose white. Afterward black and white are excluded from core B, so darken those columns. Next, code the color digit "3" (for 3×2=6), leading after three '>' skips to Cyan. Until now one has coded the 1+6=7 from the 127. It is still necessary to code for the 2 in front of the $Q_3=60$ to finish the 127. This is a Blue. For every further entry, enter the "color digit" 0 (zero). Zero means choosing the first entry from the list of available colors.

A recipient can decode this message by going along the same encoding path and extracting the extra skips made by the encoder.

When working on the last row, it may be noticed that cell 18's two neighbors, 17 and 7 are both black. This is allowed, since they are not nearest neighbors. That leaves actually 5 free color choices for cell 18, not the 4 found in TABLE 2. Therefore, mark the extra space by a "?" mark. Could this happen also in other rows of TABLE 3 when coding some other numbers?

In fact, TABLE 2 and TABLE 3 do not contain the full truth but a simple and accurate approximation. One might encounter cases in which TABLE 3 provides more possibilities than TABLE 2, never less. Hence, the described coding method will work always, except that some extra storage capacity is lost. The mathematical underpinning of this process is discussed at the forward-iteration rule (Eq. 14) in the Appendix. Accordingly, for using the full storage capacity of the tags, the entries $Q_m$ in TABLE 2, should be actualized after each encoding step, depending on the actually color configuration up to that step. In general, the encoding and decoding process is be performed automatically by software incorporating the steps described above.

A strong commercial asset of the REF Tags is their aesthetic appearance. When coding small numbers, the big majority of color digits (or SKIPS) will be zero. Froth the example above it follows that the encoding rule will soon lead to encoding a zero. Hence, only the first two or three colors will alternate along the encoding path. To improve this situation, one can change the rules by requiring that in every step one skips per default in steps, where in is the cell's number on the encoding path. Once one reaches the free color list end, the count continues from the list begin. This procedure leads to the Tag shown in FIG. 10c, showing a more balanced distribution of colors.

TABLE 3

| Encoding path | SKIP (input) | b | R | Y | G | C | B | M | w | Choice (output) |
|---|---|---|---|---|---|---|---|---|---|---|
| Core B rule | | | | | | | | | | |
| SP | 1 | > | | | | | | | + | W |
| 1 | 3 | | > | > | > | + | | | | C |
| 2 | 0 | | + | | | | | | | R |
| 3 | 2 | | | | > | > | | + | | B |
| 4 | 0 | | | + | | | | | | Y |
| 5 | 0 | | | | + | | | | | G |
| 6 | 0 | | | | | | | + | | M |
| Outer layer: map coloring rule | | | | | | | | | | |
| 7 | 0 | | | | | | | | SP | b |
| 8 | 0 | 7 | 2 | + | | | | | SP | Y |
| 9 | 0 | + | | 2 | 8 | | | | | b |
| 10 | 0 | 9 | | 2 | + | | 3 | | | Y |
| 11 | 0 | + | | | 10 | | 3 | | | b |
| 12 | 0 | 11 | + | | 4 | | 3 | | | R |
| 13 | 0 | + | 12 | | 4 | | | | | b |
| 14 | 0 | 13 | + | | 4 | 5 | | | | R |
| 15 | 0 | + | 14 | | | 5 | | | | b |
| 16 | 0 | 15 | + | | | | 6 | | | R |
| 17 | 0 | + | 16 | | | | 6 | | | b |
| 18 | 0 | 17,7 | + | | | ? | 6 | SP | | R |

At this point, cryptographers get alarmed. Two cartographers, Alice and Bob, could use some shared secret "SKIP"

rules (one for each encoding step) to hide the content of their maps. That would make the task of an eavesdropper, Eve, very difficult, should Alice and Bob change the rules after each use. Even worse. Alice and Bob might choose also another encoding path and keep it as part of their secret. Trouble is looming but Eve loves to solve difficult tasks.

FIG. 11 illustrates the standard method for counting pixel based histograms within a given region of the image. The plane is partitioned into convex polygons, like the pentagon shown as example in the drawing. Whether a pixel is inside or outside this region can be decided by computing the scalar product of its position vector with the normal vectors of the pentagon sides and then subtracting the respective thresholds. Hone associates a positive result with $\sigma=1$ and a negative one with $\sigma=0$, then all pixels inside the pentagon satisfy the condition that all five computations result in a $\sigma=0$.

FIG. 12 illustrates the prior (expected) hue distribution for the core signature, independently of the actual coded information. This is the sum of normal distributions centered at {R, Y, G, C, B, M} on the hue color angle. This distribution might be altered by badly calibrated printers and cameras. However, the presence of more than 5-6 well-separated, roughly equal peaks within a small, compact region is very rare in natural images. It provides a strong volume signal to identify core tags.

FIG. 13 shows some examples of recognized tags—note the different and sometimes difficult backgrounds. The image sizes are 640×640 pixels except for the top-left one, which is a 240×240 video-frame.

FIG. 14 illustrates an example of the process of annotating a real object: the visual tag stores a unique database insertion ID. The database stores the object's features, the tag, and the tag's unique hash value.

FIG. 15 illustrates an example of reading object annotations: after capturing the image (or video-frame) with a digital camera, the application locates the tag, calibrates the image, and decodes the tag information. The decoded 2D visual tag information is used as a key to the device database or other similar applications, to a dedicated server, a phone service provider, or to a web service. At the application's request, part of the data retrieved from the database is sent back to the originating device (in secure form, if applicable) and optionally projected into the displayed image/video stream or as SMS text.

FIG. 16 illustrates the use of the disclosed encoding and decoding methods for storing text information in machine readable format for document management purposes. The drawing contains several pages of text which has been compressed and encrypted, then transformed byte-by-byte into one or more two-dimensional blocks of hexagons obeying nearest neighbor exclusion and—in this particular case—a second nearest neighbor exclusion between red and magenta only.

DETAILED DESCRIPTION OF THE INVENTION

The main goal of this invention is to provide a machine readable annotation in all situations where machines have difficulties in capturing and interpreting reliably information addressed to humans. It provides a simple, cheap, and practical technology for tagging objects or persons so they are robustly recognized through machine vision even when they are in motion.

Figure 4:
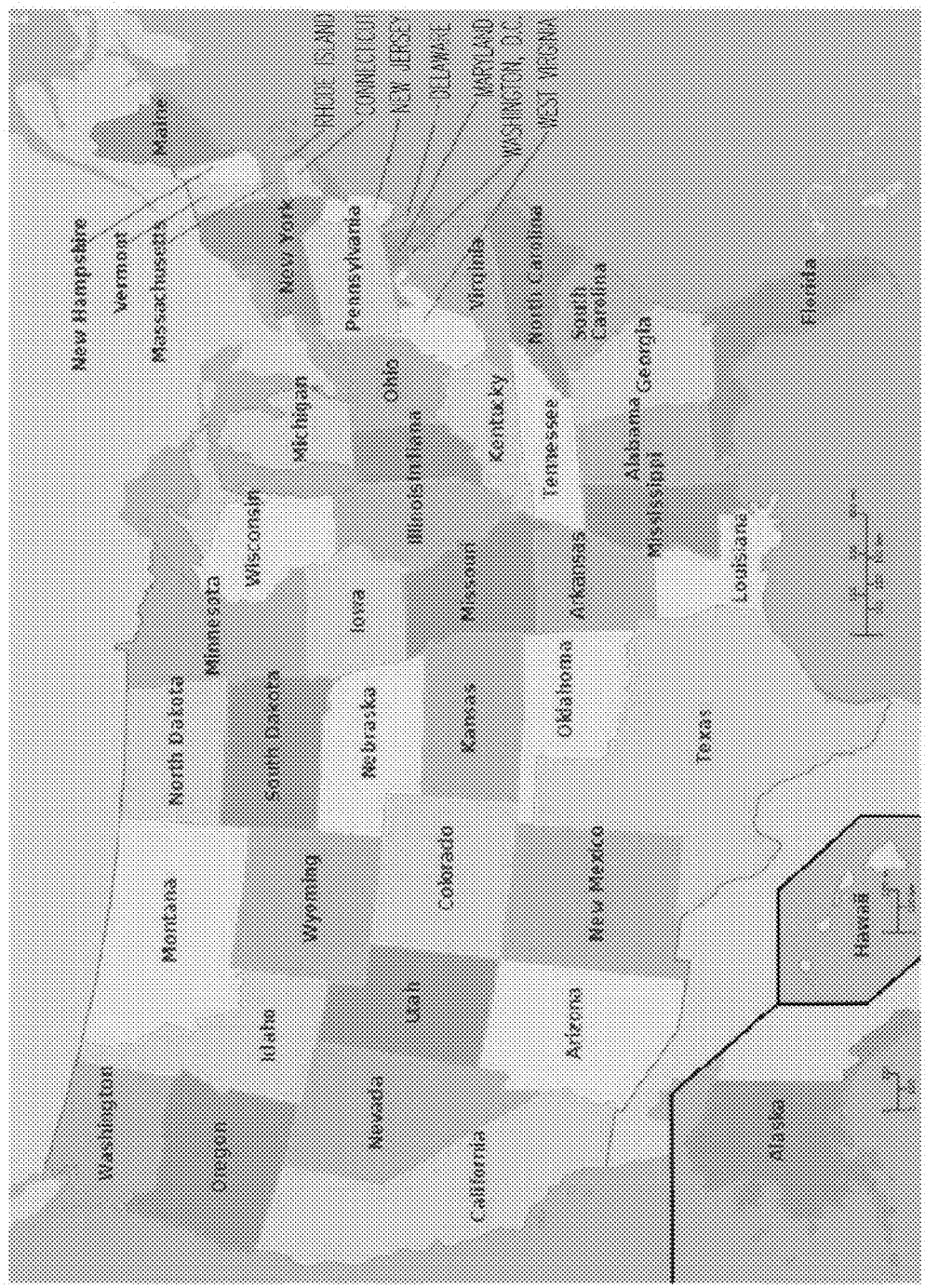
FIG. 4 is a map of the USA with each federal state being colored so that no two neighboring states have the same color. Only four colors have been used.

A REF tag is a special matrix code similar to a map of the federal states, each colored differently from its neighbors. Such a map is shown in FIG. 4 as an illustration of the famous 4-coloring problem. For storing additional information, REF tags need at least five different colors obeying specific exclusion rules between neighboring cells. The tags are preferably circular honeycomb lattice clusters.

The physical embodiments of REF Tags might be either printed or painted on a sticker, a plastic badge, tin, or ceramic plate, etc., or can be attached as a lightening, or a lightened object. FIG. 3a illustrates an interesting example. REF tags can help mobile devices navigating places without satellite access (underground metro stations or supermarkets), help the automatic routing of robots, improve surveillance systems, authenticate different objects, and perform services of all kind. They can be arranged in arrays or can change colors in time, providing for a continuous signal source. REF tags can be even printed behind human readable text, so as make possible the automatic restoration of hyperlinks from paper prints.

The main novelty of the disclosed invention is the design and encoding of the badge, together with image processing methods to optimize the location, the calibration, and the decoding of the tag's code from a low resolution image. Reading existing barcodes and matrix (2D) codes require special laser scanners or carefully taken images at relatively constant illumination: none is able to capture several moving objects.

Figure 1:
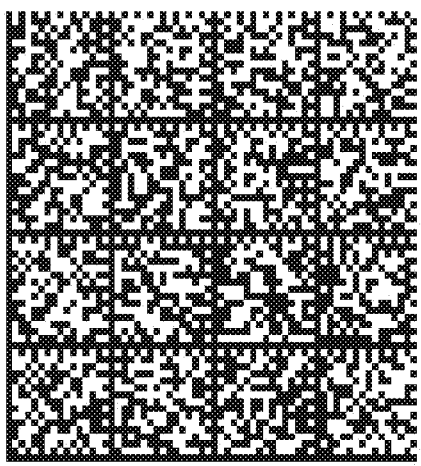
FIG. 1 illustrates two commonly used 2D matrix codes.
Figure 1:
Figure 2:
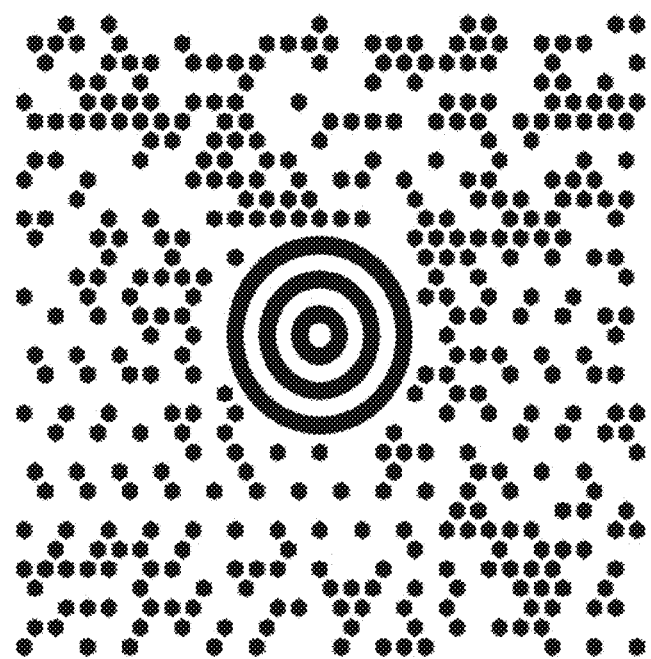
FIG. 2 illustrates the UPS "MaxiCode" for the same string as in FIG. 1.

Consider 'reading' a visual tag. After a camera has taken a picture (or video frame) of the scene, a computer program must find none, one, or more tags and transcribe them into the corresponding integer numbers. This program or hardware device (decoder) must perform at least the following operations:

LOCATE (Target Acquisition): The system must reliably find the signature of one or more badges in the captured image. All existing matrix codes rely for this operation on specific anchor forms, which are lines, circles, or squares of predefined form and structure as seen in FIG. 1-FIG. 2. Instead, this invention uses the central part of the tag to generate a specific color histogram, which is detected by a probabilistic method.

CALIBRATE: In real life situations, parts of captured image will have a poor quality (shadows, etc.). Since the tags contain many white and black colored hexagons, they can be used to equilibrate the ROB colors in their local neighborhood.

DECODE: The size and position of a tag in the captured (digital) image is arbitrary. To deal with different sizes, I use a one pass multi-scale analysis of the image. Rotations are handled by using rotation independent codes. The information content printed on the badge can be the result of several operations, including data compression, error correcting coding, and encryption. The decoding contains then decryption, decoding, and decompression, in this order.

The three steps above are implemented using efficient (linear) and optimal (best possible) programmable mathematical methods (algorithms). They are so fast that even a mobile device can continuously track and annotate several tags in real time. Eventually, such algorithms might be fully integrated on the capture device hardware.

Choosing the Right Lattice and the Right Cluster Shape

Barcodes mark commonly different products or documents using a graphical code for integer numbers. Wikipedia, Ref. 3), gives a good introduction to barcodes, including the respective patents. Almost all barcodes are binary and thus printed in black and white; they are read effectively with laser scanners. The first widely used matrix code was the (six bit) Braille code (1824), coding letters. Among the matrix (or 2D) codes the QR and the Data Matrix codes (FIG. 1) are the most common ones. These 2D barcodes are used as post marks and online ticket distribution, and other mobile applications. QR-codes are also recognized by smart phones with a good camera and Android OS, for instance. However, they cannot be reliably captured from a distance or in unstable conditions.

Closest to our approach is the MaxiCode used by UPS (see FIG. 2). MaxiCode uses the honeycomb lattice. This black and white code can be used in a low and a high "noise" variant and can store up to 93 bytes (ASCII symbols). All examples shown in FIG. 1-2 store the full string "Rujan Entwicklung und Forschung GmbH, Freiburg, Germany". MaxiCode has been standardized under ISO/IEC 16023 and is in the public domain. The original patents are quoted in Ref. 1).

Another patent relevant to our invention is G. Jancke's (Microsoft) high capacity color barcode (HCCB) Ref. 2) because is the first matrix code using real colors. This makes sense because actual sensor hardware has separate ROB color layers and thus provides high hue sensitivity. A HCCB code shown in FIG. 3, more information can be found on the Microsoft web page of Ref. 4). FIG. 3 stores a Reference to the same string as above. Such tags are generated and recognized solely by the dedicated server at http://tag.miscrosoft.com.

The present invention uses colored hexagons but provides several new features making it apart from both MaxiCode or HCCB. Both FIG. 2 and FIG. 3 show some designed white stripes: between neighboring hexagons in FIG. 2 and between neighboring rows in FIG. 3. These stripes are an integral part of the patent embodiments and facilitate the lattice segmentation for MaxiCode and a deskew operation followed by a row-edge detection for HBBC.

The REF tags are located using a volume signal. The full tag is segmented easily because no two neighboring cells have the same color. This follows the same logic as that of a cartographer's coloring each country or state in a different color, so that their size and borders are easy to see at a single glance. No complex methods involving Fourier transforms are needed.

The sphere packing problem deals with the properties of the densest arrangement of spheres and leads to the close-packed lattices FCC and BCC in three- and to the honeycomb lattice in two-dimensions. To achieve a maximal information density per area or volume, the shape of the optical information carrying unit, or elementary cell, should be as close as possible to a sphere or a circle. Ref. 11) describes in detail these and other interesting issues related to sphere packing. The densest sphere packing in two dimensions corresponds to the honeycomb lattice (see FIG. 5), achieving a density of $$\frac{\pi}{2\sqrt{3}},$$

as computed first by Gauss, see Ref 12).

Using circles is a good starting point but requires a background color for the small, non-covered fraction of plane. In practice, the best is to use the honeycomb lattice, because it is extremely robust against distortions. Should the centers of the hexagons slightly move, their Voronoi cell Ref. 13) remains with high probability a hexagon. Even if these centers were completely randomly distributed on the plane, constructing their Voronoi tessellation reveals that both the average and the most probable number of sides of the Voronoi cells remains six.

Encoding Reference Tags

Next, I disclose how to compute the storage capacity of REF tags and how to encode integer numbers into color codes. Visual reference tags must be relatively large when compared to usual matrix codes, since they must be captured from a larger distance by poor resolution sensors. Furthermore, the color code itself must be very "artificial", in order to avoid false matches with a natural background. In the following I describe only the 2D embodiments of the invention, with the understanding that the presented methods can be easily generalized to higher dimensions.

A standard digital cameras provides both a high resolution RGB color image—and a low resolution video stream used for monitoring the image. In our preferred embodiment, the program must be fast enough as to use the video frame in detecting and evaluating the tags. This means that the monitoring video stream can in real time mark and add information to the moving targets.

In the HSV (hue, saturation, value) color space the color part is coded by the hue (color angle varying between 0 and $2\pi$), and the saturation (color intensity). The preferred embodiment uses black, red, yellow, green, cyan, blue, magenta, red, and white colors, in this order. Each 'real' color is situated at an angle of $\pi/3$ from each other, at a high saturation value. A single hexagon cell has thus 8 states (3 bits) denoted by $\{b, R, Y, G, C, B, M, w\}$, respectively, or $\{(0,0,0), (1,0,0), (1,1,0), (0,1,0), (0,1,1), (0,0,1), (1,0,1), (1,1,1)\}$ in sRGB notation, forming a Gray code Ref. 16). A lower case $\{b, w\}$ denotes black and white, respectively. $\{B\}$ means always Blue.

In what follows, different schemes for designing reference Tags will be presented, starting with the simplest ones. This is not an exhaustive list. It should rather help someone who desires to design its own visual tag with the necessary know-how and the understanding of the coding and decoding process.

The Core Reference Tags

A "CORE" reference tag consists of a central hexagon and its six surrounding neighbors. A core Reference tag contains always all six real colors $\{R, Y, G, C, B, M\}$ and one of the $\{b, w\}$ gray shades exactly once. The core A displays the black or white in its center, while the core tag B on the outside layer. Tag B is slightly asymmetric, a useful feature for rotational invariant coding.

The REF Tag A is shown in FIG. 6 left. On the right, one sees a graphical illustration of the tag, on the right a possible physical realization, which I call a "badge". A badge can be realized by different technologies from different materials, including being displayed on a monitor or being projected on a screen or other background. Each hexagon displays one particular color from the set $\{b, R, Y, G, C, B, M, w\}$. For graphical display on the badge, a light gray background is preferable.

The six different real colors provide the tag's primary "signature", which is a pixel based hue histogram. A secondary signature is provided by the circumscribed circle of the tag and a third one by the edges of hexagonal faces. If the coding is rotational invariant, a given color, e.g. black or white for the B Tag and Green for the A Tag, is chosen as starting point (SP).

A STANDARD ENCODING PATH moves from the SP to the center and back to the right of the starting point, following then in clock-wise the outer layer (sec FIG. 10a). The cost of rotational invariant coding is a six fold reduction in the number of configurations for the tag A. Tag B is by construction rotational invariant. The choice of the encoding path allows for the use of dynamic programming methods, as explained in the Appendix.

The tag A can assume one of the $\Omega = 2 \times 6 \times 5 \times 4 \times 3 \times 2 \times 1 = 1440$ states, the storage capacity (2 base logarithm of $\Omega$) is 10 bits, compared to the 3×7=21 bits unrestricted capacity. If the code is rotational invariant, the number of states is Ω=2× 5××3×2×1=240, somewhat less than 8 bits. The code consists of the {b, w} color of the centre and the two dimensional positions of the {R, Y, G, C, B, M} colors. The tag B has also 1440 states and is rotational invariant.

The core A and B tags have enough states to handle a number of important applications, including identifying service personnel in retail applications, meetings, providing navigation hints for moving robots, etc. The hue signature of core tags is a distribution with six equidistant peaks, each covering roughly the same area in the hue space—see FIG. 12. Each peak corresponds to one of the real colors of the hexagons. The signature does not require any specific color order, only that the peaks are present within a given area. An efficient and optimal method for detecting this signature is disclosed in the Appendix.

By imposing constraints on the choice of colors the storage of rotational invariant codes is reduced from 21−3=18 bits to 10 bits, corresponding to a R=1/2 redundancy ratio, as used in most error correcting codes. Should one real color be missing (occluded or dirty), the constraints allow to reconstruct it. Errors can be detected if some colors occur several times or infringe on the map coloring constraint. Errors not infringing on those constraints cannot be detected with such simple methods.

The Reference Tags 2, 3, and Cluster[1]

To increase the storage capacity of the tag, add one new outer layer surrounding the core tag. This leads to the tag shown in FIG. 10*b*-*c* called Tag 2. Similarly, one can add a third layer as shown in FIG. 8. Not surprisingly, the tag is called Tag 3. Since the core pattern already provides the signature and the rotational invariance, the outer layers 2 and 3 can obey less stringent conditions than the core.

For printing accuracy and easy edge detection, I require only that each cell has a different color than its neighbors (map coloring rule). Three hexagonal cells meeting at vertices have all different colors. This is a good design: a strong, area proportional signature for the core tag and easily detectable edge SEGMENTS (edges+end of lines) between any neighboring hexagon cells.

Consider the Tag 2 with a B-core of FIG. 10*a*. TABLE 2 displays a tight lower bound on the number of possible configurations. Its value is Ω~144×7×(5×6)$^5$×4 or 39 bits, only one bit less than the theoretical value. I call this type of estimate a "single path approximation": it takes into account only the "main" path contribution to Ω and is obtained by following the encoding path and counting in each step the number of available colors, assuming that all already painted neighbors have different colors.

The full storage capacity of Tag 2 is given by the so-called chromatic function, as defined in (Eq. 3). The main error in the above estimate is that it leaves out the possibility that on the outer layer some cells might have say three or more already colored neighbors, two of which have the same color. However, when using eight colors or more, the effect of such cases on the total capacity is negligible.

Storing GPS co-ordinates in grads, minutes, and seconds requires 21 bits. Hence, when using a Tag 2 for storing a GPS coding application there remains ample space to apply error correcting codes: either a turbo code Ref. 15) or a low density parity code Ref. 16): both are coming close to the optimal Shannon bound. Alternately, additional information could be stored on the tag. Another way of select information is to reduce the GPS co-ordinates to the region of interest only.

The REF Tag 3 is shown in FIG. 8. Its third layer consists of 12 additional hexagons. Performing the same type of estimate as above will add another 29 bits to the tag capacity—the total is now 68 bits. Such a tag could robustly encode 64 bit database keys, for example.

Another way of extending the capacity of the core is to iterate it. A first iteration of the FIG. 6 is shown in FIG. 9 and is called a "first order REF-Cluster" (or REF Tag Cluster[1]). Following the single path estimate as for REF Tag 2 and 3 one can show that this tag can store at least 139 bits for a B core.

With increasing size one can store—as expected—more information. However, the relative resolution for each cell degrades and the difficulty of correctly decoding the tag increases. For fast and good recognition performance I recommend to not exceed the size of the REF-Cluster[1]. As the resolution, image quality, and processor speed of digital cameras and embedded systems increase, however, embodiments consisting of larger tags could prove useful in the future. TABLE 1 shows at a glance the storage capacity of the different tag choices, depending on the core. Core B ensures automatically rotational invariance.

I presented above a simple way for estimating the tag's capacity. The exact calculation is presented in the Appendix. Natural integer numbers can represent without loss of generality anything a computer could store. How to store them using the tag's colors? I disclose below a simplified method so that someone not skilled in higher mathematics can understand and use it. The exact method is also quite simple and is based on the mathematical formalism provided in the Appendix.

Consider two cartographers, Alice and Bob, who wish to exchange some information ("tomorrow at 6 pm at Katy's bar") with the help of a REF Tag 2. For simplicity, let's assume that they agreed already on a number of standard messages, of which the above one corresponds to number 127. Alice writes and sends the message, Bob receives and reads it. In secure communication terms, Alice is the "encoder", Bob the "decoder".

Both Alice and Bob use the encoding path shown in FIG. 10*a*. Without knowing the encoding path, Bob cannot read correctly Alice's message. They both can generate Table 2, in which I noted how large the numbers can become when coding each site along the encoding path. Table 2 is calculated based on the simple counting arguments used to estimate the capacity of Tag 2.

Before considering what Alice does for encoding 127, let us see how she would encode 0 (zero). The rule is simple: she goes along the encoding path. The hexagon called SP is then black (first available color). The center cell 1 must be a real color, so is the first available one, Red. On each step. Alice writes down the list of colors and removes the ones which are already used (in the core) or the ones already displayed by the neighbors (on the outer layer). Then, she chooses the first available color. By following this procedure for all hexagons in the order prescribed by the path in FIG. 13*a*, she colors a '0'.

Alice codes 127 with the help of TABLE 2 and TABLE 3, as already described in previous paragraphs. The detailed mathematical derivation for encoding any integer number less than the chromatic function is given in the Appendix. The only difference between the one path approximation and the exact counting is that the entries of TABLE 2 must be generated in each encoding step according to the forward-iteration formula (Eq. 14).

Learning Signatures, Error Correction, Security

In practice, the encoding/decoding procedure it performed by a software program based on (Eq. 14). Since the tag capture environment might change from case to case, it is important that the software can handle different cases by adapting its parameters, "learning" the core signature. If the printer and the camera are perfect, the expected (prior) signature of the core tags would look like the hue distribution shown in FIG. 12. In reality, this ideal signature is distorted by many factors related both to the printing/displaying mechanism as well as to the camera (capture) device.

A new feature of the REF System is that it provides the additional choice of creating a case dependent, realistic signature distribution directly from captured examples. No other matrix code system provides such a learning procedure. The main ideas for building a self-organizing system are well exposed in Kohonen's book Ref 14).

Two Signature Learning Methods

After printing several different tags on the production printer, the user makes about 20 snapshots with the production capture device in typical, realistic situations. If other methods are used to produce the badge, follow a similar procedure. The method described below is also called "learning from examples".

The snapshots are inserted into the "Examples" folder provided by the software and the learn process is started. The learning algorithm moves iteratively the color centers as to maximize the overlap to the recorded examples and minimize their standard deviation thereof. The user gives feedback regarding the identified (and not identified!) tags and the correct color of some questionable items. This helps the system to move internally the color distribution peaks so as to improve color discrimination.

The software system provides a second possibility for refining its signature expectation based on processed images alone ("learning by doing"). The user decides if it wants to use this feature. Internally, the software system adjusts the predefined thresholds (parameters) and the reference color points towards the "centers" of the color bins as sequentially updated during run-time. This follows closely the adaptive schemes described in Kohonen's book Ref 14).

Error Correction

A cell of the tag is completely lost ('erased') either because it is not visible or because some other object or dirt is occluding it. Decision errors occur when the recognition engine (usually a computer program) cannot distinguish between two different colors and makes a false choice. For REF tags erasures will occur more often than errors. Detecting erasures and errors is particularly simple for the core tags, since we know that originally all colors have been different.

Neighboring cells cannot display the same color. If the image processor generates two neighbors with the same color, one of them is in error. In the vast majority of cases such errors involve only a few optical units (hexagons). The recognition algorithm provides a list of tag colors for each hexagon along the encoding path, together with an estimate of their error probability. This format is more detailed than a standard error correcting decoder expects. As a result, the ECC standard models described below must be slightly enhanced to take advantage of this additional information. Should one run into frequent erroneous decoding, the next paragraph presents some potential remedies.

Recently, very fast algorithms for erasure corrections using tree diagrams have been proposed—see Ref. 18). CD's, DVD's, and matrix codes use as standard interleaved Reed-Solomon (RS) error correcting codes (ECC). RS ECC are linear codes which for the price of K additional symbols can correct K/2 errors and K erasures, no matter where they occur. Recently, "list decoding" linear codes have been developed, they are slightly better than RS standard codes. Some non-linear codes, Turbo codes Ref. 15) and in particular low-density parity-check Gallager codes Ref 16) are even better, almost saturating the Shannon bound. In the simplest implementation, the encoding step of the ECC method should be performed on the Reference data BEFORE the Reference tag generator and the decoding step AFTER one recovers from the image the respective key or list of keys including error probability estimates.

Security

In our context security is not related to controlling the access to the displayed References (keys) but rather to who, how, and when can access with these keys the systems (database, web-service, local application engine) storing the pointed-to information. Key security can be achieved by encrypting the message with standard methods BEFORE encoding the tag but this makes sense only if the data access is not secure. Real security is achieved by requiring strong certification from the person or application trying to access and transfer the content pointed by the tag generated key. Such standard steps are not part of the invention.

Nevertheless, REF tags could be used as an additional security channel. At the time of this writing, for instance, there is gang in Berlin, selling falsified subway monthly tickets. A solution to such problems would be to print an additional Tag 2 on each ticket and store in a database both the serial number and the tag printed on the ticket. When somebody buys a monthly ticket, it makes a photograph of the tag, sends it via MMS or—if the phone already has the necessary software—via SMS—the decoded REF Reference to a publicly known access phone number. The server returns an SMS with the corresponding serial number or OK/FALSE, then deletes that entry pair from its database. For this application a rotational invariant REF Tag 2 with 39 bits is enough: Berlin has at any time less than 5 Million people living there longer than a month and a 32 bit number can already store about 3.5 Giga-keys.

Some Application Domains

Global Tags

The relatively low storage capacity of REF Tags is not a problem when handled correctly. We all have names which are more or less duplicated in the world: but every John Doe is unique in his village. So is a REF Tag in its application environment. If we want to identify John Doe in a large city, you must add to his name additional information, like his phone number or address. The same applies for the IP address of every computer. RFID tags face similar logistic issues. Using global REF tags is similar: access network-services similar to the DNS support for RFID, which through electronic product codes (EPS) can uniquely name a server responsible for delivering additional data via the Object Naming Service (ONS). Globally accessible tags must of course be registered with the DNS or other similar services.

Person Identification

This is the introductory example: use REF tags at Meetings, parties, weddings, gatherings, etc. The participants wear REF badges or REF Tags printed as water marks on their name badge. A simple web or phone camera can then identify them and provide additional services. For employee or secure identification, however, these tags provide no real security because they might be easily forged. For such applications additional security channels must be built in; known only to the badge printing system. Such a badge can be stolen but not falsified, because the forging agent does not know what kind of relationship exists between the different channels.

"Object of Interest" Tag

Tagging objects for additional information: this might be the typical scenario at an art or commercial exhibition (which does allow taking photographs), billboards, packing material, etc. Tags displayed on packing material can be used for authentication following the method described in the previous paragraph on security.

Visual Search

Use a mobile camera when "searching" for a specific object, among a plurality of similar (and also tagged) objects. This can be useful when looking for someone we never met personally before, a certain book on a bookshelf, a specific brand product in a supermarket, etc.

Surveillance

In certain situations one must track machines, moving objects, or persons for a longer period of time. Together with an appropriate surveillance system, such a system can trigger alarm should a required person disappear or a new identity (with or without tag) intrude. Eventually, objects could be also tracked by projecting (invisible) light patterns on moving objects and following, identifying, and tracking them with the help of appropriate capture devices and the methods described in this invention.

Robot Navigation

In many factories floors robots move autonomously, carrying out different tasks. For robots (or any other autonomous objects) the REF Tags could play the same role as a street sign and give orientation queues. This might be both cheaper and more robust than existing solutions.

Car Assistance Systems

Cars include today many intelligent systems improving the driver's security. Traffic signboards using REF Tags could be recognized easier by the board camera than the standard ones and can provide additional information to the car's traffic monitoring system. This approach would obviously help autonomous cars or trucks.

No OCR Needed

In any application where optical character recognition is used for reading text, like for visit cards or name tags, it is advantageous to use instead or in addition a REF Tag. They are smaller and very accurate when the reader is a machine, not a human being. Accessing a specific web-service might provide a link to the full content of the document whose tag key has been identified. Similarly, larger rectangular tags can store also the relevant part of business documents, allowing for an automatic capture of paper documents. This is faster and more accurate than standard optical character recognition methods.

GPS Tags, Street Signs, and Augmented Reality

A GPS co-ordinate has the format XXX:YY:YY, where XXX can change from −90° to +90° (or from 0° to 360°) and YY takes values between 0 and 60. Taking both longitude and latitude into account, this makes about 21 bits. Hence, a REF Tag 2, like the tags of FIG. 10b/c, could easily store it, including a strong ECC scheme. Several of the described REF Tags have a higher capacity, so they can be used as visual marks on street name tables, buildings, or any place wishing to display its exact position and perhaps—via an Internet link—additional information related to that object. Such places can also illuminate or actively project their tags at night. Navigating places without satellite access, like the Paris Metro, could be made easy for US or other tourists not speaking French.

Retail Applications and Personalized Services

Consider a butcher shop where different vendors use the same weighing scale. Whenever a given vendor uses the scale, it has to key in its own identification number. This task—and many similar ones—can be automatically performed by the scale's embedded computer if the employees are wearing different REF Tag A badges and the scale includes a small digital camera. There are many similar situations, when one central resource is used by several employees, for instance, or several users are provided personalized services based on their automatic visual identification via REF tags. Another obvious one is to use one or more REF tags to login in a computer.

Paper Hyperlinks Via Information Overlap

Some part of a paper printed document might contain in background REF Tags, thus practically linking in a non-intrusive way specific human readable information to machine readable information. If the hexagons are somewhat larger than the typical font size, using a median or similar preprocessing filter will remove the text in front of the tag or the tag can be directly decoded. The text foreground can be then perfectly retrieved by subtracting the REF Tag background.

APPENDIX: CAPACITIES, CODECS, ALGORITHMS

Capacity Calculations

This Annex summarizes the mathematical formalism needed for computing the capacities of REF tags and for encoding and decoding information from such tags. Reading and understanding this part requires higher level mathematical skills and is included here for those who would like to reproduce or generalize the results presented in this invention.

Consider the map of a continent or a federal state like USA or BRD. The map coloring problem is easy to formulate: what is the minimal number of colors a cartographer must use in order to color an arbitrary two dimensional map so that each country (federal state) has a different color from its neighbors. It has been long expected that this number is four. Mathematicians struggled over 140 years with the proof, which was given only recently. It involved the first use of computer generated enumerations in a mathematical proof, Ref 17). FIG. 4 shows the four colored map of the federal states forming the U.S.A.

For a number of colors q larger than four, the interesting question is not whether one can color a map but in how many possible ways. Let us denote this number by $\Omega(q)$. The capacity of the tag is defined then as $$C = \lfloor \log_2 \Omega(q) \rfloor \quad \text{(Eq. 1)}$$

bits, where $\lfloor x \rfloor$ is the integer part of x.

Computing the capacity of the core tags is simple, due to the core constraint that each color occurs only once. For instance, the tag B has one white or black color on the outer layer. The rest 6 hexagons have all different (real) colors. Let the number of real colors be q. Then:

$$\Omega(q) = \quad \text{(Eq. 2)}$$
$$2 \times q \times (q-1) \times (q-2) \times (q-3) \times (q-4) \times (q-5) = \frac{2q!}{(q-6)!}$$

Computing the capacity of tags with nearest neighbor exclusion (map coloring rule) is more difficult. In graph theory, Ref. 6), the function $\Omega(q)$ is called the chromatic function. It can be calculated with the help of the Birkhoff (1912) formula, as a polynomial in q:

$$\Omega(q) = \Sigma_{G' \varepsilon G} (-1)^{b(G')} q^{n(G')} \quad \text{(Eq. 3)}$$

The sum runs over all subgraphs G' of the tag. b(G') the number of bonds (edges) in the graph and n(G') the number of components (clusters) in the G' subgraph. Here single (not connected) vertices count as one cluster. This formula can be easily derived from the random cluster formulation of the q-state Potts model (see Ref. 7).

As an example, let us assume that a core B fulfills the map coloring rule. Following the notation of FIG. 10*a*, one has to compute:

$$\Omega(q) = \sum_{\{l_i\}} \tilde{\delta}(l_1, l_3)\tilde{\delta}(l_1, l_4)\tilde{\delta}(l_1, l_5)\tilde{\delta}(l_1, l_6) \quad \text{(Eq. 4)}$$

$$\tilde{\delta}(l_{sp}, l_2)\tilde{\delta}(l_2, l_3)\tilde{\delta}(l_3, l_4)\tilde{\delta}(l_4, l_5)\tilde{\delta}(l_5, l_6)\tilde{\delta}(l_6, l_{sp})$$

The sum represents a short notation for the seven sums over the variables: $1_{SP} \in \{1,2\}, 1_{1-6} \in \{1, 2, \ldots, q\}$. The symbol $\tilde{\delta}(l_1, l_2) = 1 - \delta(l_1, l_2)$ is the complement of the Kronecker symbol $\delta(l_1, l_2)$ and is zero if $l_1 = l_2$ and one otherwise. As required, configurations where the two sides of a common border have the same color do not contribute to the chromatic polynomial. A similar formula can be written for the whole Tag 2 but is too long to fit here.

To evaluate the above sums one needs identities of the form $\Sigma_{l=1}^{q}\tilde{\delta}(l, m) = q-1$; $\Sigma_{l=1}^{q}\tilde{\delta}(a, l)\tilde{\delta}(l, b) = q-2+\delta(a, b)$, etc. Nevertheless, this calculation can be quite laborious. For larger tags this method is not practical and no simple mapping between integer numbers and the tag's color configurations emerges.

Therefore, I introduce a simple approximation which—while producing a tight lower bound of the capacity—is easy to understand and implement in practice. For the record, this is a variant of the (sparse) transfer matrix method of statistical physics, also known as dynamic programming method in computer science.

As an example consider again the B tag with the map coloring rule, as in (Eq. 4). Note that in this case a B tag can be paint using only three colors: one in the middle and two different ones alternating around the center. Start with the SP as shown in FIG. 10*a*: this cell can assume q different colors. Coloring hexagon 1 in one of the remaining q−1 colors gives a factor of q−1. Hexagon 2 cannot assume the same color as SP or 1, so it has q−2 choices. The same number of constraints is valid for hexagons 3, 4, and 5. Hexagon 6 has q at least q−3 choices. Hence, $$\Omega_1(q) = q \times (q-1) \times (q-2)^4 \times (q-3) \quad \text{(Eq. 5)}$$

This is an approximation because in the last step 6 has q−2 choices, not q−3, if 5 has the same color as SP. To account for this case, split the colors of SP in q−1 colors (different from 5) and 1 (identical to 5). Adding the corresponding contributions one obtains:

$$\Omega(q) = (q-1) \times (q-1) \times (q-2)^4 \times \quad \text{(Eq. 6)}$$
$$(q-3) + 1 \times (q-1) \times (q-2)^5$$
$$= \Omega_1(q) + 1$$

Apply now this approximation to the outer layer—hexagons 7-18—of a Tag 2 with core B. The first two and the last hexagons will be handled separately. When Alice is at an odd site, it sees only two colored nearest neighbors (one from the inner B-core, one from her previous choice). Hence, she can make q−2 choices. Alice does not care about the "empty" neighbor, because she will take care of it in the next step. The following even numbered hexagon has three already colored neighbors, so it can be paint in at least q−3 ways. Taking into account that 7 has only one, 8 only two, and 18 at most four different neighbors, the simplest approximation gives:

$$\Omega_1(q) = (q-1)(q-2) \times [(q-2)(q-3)]^4 \times (q-3)(q-4) \quad \text{(Eq. 7)}$$

I will call this the single path approximation, because it counts along the single path with the maximal contribution to the chromatic function.

At even numbered hexagons two of the three neighbors might have identical colors (hexagon 10 might have 3=9 neighbors). Following the same "case splitting method" as in (Eq. 6) one obtains a secondary path approximation:

$$\Omega_2(q) = [(q-1)(q-2)+1] \times [(q-2)(q-3)+1]^4 \times [(q-3)(q-4)+1] \quad \text{(Eq. 8)}$$

We are not yet done: this calculation ignores that hexagons 6 and 7 might have the same color, allowing 18 to take on q−3 colors, instead of q−4. Splitting the colors in 7 leads to $\Omega_3(q) = \Omega_2(q) + 1$ (Eq. 9), adding yet another state to the chromatic function.

Encoding and Decoding Integers

Let us first recapitulate some elementary facts about expressing numbers on a q-nary base. Next, I generalize them for the constrained geometries of the visual tags. Typical examples for known q-nary bases are the binary (q=2), the octal (q=8), hexadecimal (q=16) used in computer science and electrical engineering, the usual decimal (q=10) base, etc. An integer number can be expressed as a polynomial in powers of q:

$$N = \Sigma_{n=0}^{k} a_n q^n, \text{ where } a_n < q, N < q^{k+1} \quad \text{(Eq. 10)}$$

If we know N and want to compute $\{a_n\}$ one can follow two routes. Using $\lfloor X \rfloor$ for the integer part of X, one obtains the back-iteration recursions as following ($N_{k+1} = N$):

$$a_n = \left\lfloor \frac{N_{n+1}}{q^n} \right\rfloor, \quad \text{(Eq. 11)}$$
$$N_n = N_{n+1} - a_n q^n = N_{n+1} \bmod(q^n)$$
$$\forall n = k, k-1, \ldots 0$$

Another way of encoding the number N is to compute first $a_0 = N \bmod(q)$, then subtract it as $$N_1 = \frac{N - a_0}{q}$$

and then iterate this procedure forwards:

$$a_k = N_k \bmod(q), N_{k+1} = (N_k - a_k)1/q^k, N_0 = N \quad \text{(Eq. 12)}$$

I generalize next this representation in terms of variables which represent the number of available choices along the encoding path. Hence, instead of $q^k$ our coefficients will be $Q_k$, where the Q's are the products of available states along the path until the k−1-th element. When using the simple approximation $\Omega_1(q)$ in (Eq. 7), one can compute in advance the products $Q_n$ along the encoding path and then use the form $$N = \sum_{n=0}^{n=k} a_n Q_n, Q_n = \prod_{k=0}^{n-1} q_k \text{ for } n > 0, Q_0 = 1 \quad \text{(Eq. 13)}$$

This approximate coding is shown in Tables 2-3. TABLE 2 contains the sequence of color choices along the encoding path according to the "one-path" approximation. TABLE 3 summarizes then the encoding of number 127 on a Tag 2 with a core B. In each step, the encoder computes the corresponding path product $Q_n$ from TABLE 2 and the color digit $a_n = N_{n-1} \bmod(Q_n)$.

As explained in Eqs. (7-9), when taking into account several paths the number of available states is known at a given point of the encoding path but any future choice along the path might depend on the actual choice of colors. This fact rules out the backward iteration (Eq. 7), where one must know in advance all $Q_n$'s. However, the forwards encoder still works!

The forward iteration is the natural choice for encoding uniquely any integer number along the encoding path:

$$a_k = N_k \bmod(q_k); N_{k+1} = \frac{N_k - a_k}{q_k}, N_0 = N \quad \text{(Eq. 14)}$$

In step k, corresponding to the k-th point of the encoding path, Alice looks at all already colored cells and reads out the actual $q_k$, the number of available colors, including the special cases when one or more neighbors are identically colored. $N_k$ is known from the previous step, so she can go on computing $a_k$ and $N_{k+1}$.

For instance (see Table 2), if N=127, she computes first $a_0 = 127\% \ 2 = 1$, then $$N_1 = \frac{127-1}{2} = 63,$$

$$a_1 = 63\%6 = 3,$$

$$N_2 = \frac{63-3}{6} = 10,$$

$$a_2 = 10\%5 = 0,$$

$$N_3 = \frac{10}{5} = 2,$$

$$a_3 2\%4 = 2,$$

$$N_4 = \frac{0}{4} = 0,$$

as discussed previously (a % x stands for a mod(x)). The only difference between the one path approximation and the exact forward iteration is that TABLE 2 cannot be computed in advance but its content must be generated on each encoding step.

The forward iteration takes into account all paths contributing to the chromatic function. A rigorous proof of this statement is beyond the scope of this Appendix and involves—among other things—showing that the forward iteration method is equivalent to a graph labeling algorithm. Decoding a colored path follows the encoding algorithm backwards: after identifying the color digits $a_k$ and the number of actually available colors $q_k$ along the encoding path, the number N is reconstructed from (Eq. 13).

Linear Time Processing for Finding all Tags in the Image

I show now how to find the signature and decode a Reference Tag in one sweep through the image. The possibility of evaluating only every second, etc., pixel is discarded as part of the preprocessing. Since the tag could be positioned in any part of the image, the computer must access at least once the full image in order to find it. It is assumed that none, one, or more reference tags have been captured by a digital device and that the processor on which this program will run has already a copy of the image header and a pointer to the raw image.

It is known by those with some experience in the art of statistics that the law of large numbers applies once the number of samples is M≥12. Hence, for a sufficient statistical signal I require a population larger than 12 pixels per color cell. For the core tags this translates into a size of 7×12=84 pixels and roughly a radius of 21 pixels for the core subscribed circle. The relative size of the tag/image can be then very small in high resolution images and about 1% of a 240×240 video frame. Inversely, this will allow identifying a maximal number of 10-15 objects per image for a video frame. If the application does not need to recognize very distant tags, one can greatly improve the processing speed by scaling down a high resolution image so that the smaller of the image height and width is about 240 pixels large. The minimal size of a rectangular window will be then fixed at 24×24 pixels. These numbers are used only as a rule-of-thumb: your device might require a different parameterization.

The Reader skilled in the use of image processing methods might remember how computational geometry decides whether a pixel is inside or outside a convex polygon. This is explained for the pentagon shown in FIG. 11. Compute the scalar product of the pixel position vector $\vec{x}=(x, y)$ with the normal vectors of the pentagon sides and then subtract the respective thresholds $\theta_i$. If the resulting number is positive, set $\sigma_i=1$, otherwise set $\sigma_i=0$. For pixels to lie inside the polygon all $\sigma_i$ must be 0. Alternately, one can compute the sign of the z-direction of axial vectors $(\vec{x} \times (\vec{r}_2 - \vec{r}_1))_z$ where $\vec{r}_2, \vec{r}_1$ are the end points of a given pentagon side followed in clock-wise direction. Both methods are very effective and require the same number of operations.

When searching for the tag cores I need to compute a color histogram and decide if it has the desired signature. First, cover the image with circular windows of size 25, then with size 50, 100, and 200, for example. As illustrated in FIG. 5, I suggest using hexagons instead circles. Consider the sides of one hexagon, as shown by the blue X-ed hexagon in FIG. 5, and use the method presented in FIG. 11 to implement it. The honeycomb lattice is partitioned naturally into three sub-lattices, shown in different colors in FIG. 5 A pixel belongs to the blue sub-lattice hexagon denoted by X if and only if it falls between the lines numbered (1,2), (3,4), and (5,6).

For a person skilled in elementary geometry, it is not difficult to recon that given a point in the plane and its projection on the three main directions of the hexagon normal vectors, its sub-lattice can be computed using three mod(3) operations and the corresponding hexagon coordinates by three integer divisions. Each hexagon can be described by a triple integer co-ordinate system. In the standard image co-ordinate system, where the y co-ordinate runs from the top to the bottom of the image, the hexagonal normal vectors read (0, 1), $$(\cos\frac{\pi}{3}, \sin\frac{\pi}{3}),$$

and $$(-\cos\frac{\pi}{3}, \sin\frac{\pi}{3}).$$

Note that the system of lines orthogonal to each normal vector must include both the dotted and the dashed lines shown in FIG. 5. Instead of real numbers lying in the [−1, 1] interval, one can use integers representing them to three or four digit accuracy.

Accordingly, having initialized an empty histogram for each covering hexagon, going once through the image will allow for counting all those histograms at once. Furthermore, by resizing the hexagon lattice by a factor of two (by leaving out every second line in FIG. 5, one can at the same time count the "double"-sized lattice covering hexagon histograms, involving only 6 additional integer operations. The data can be arranged in such a way, that one needs the pass only once through the image pixels: for each pixel compute its contribution to hexagonal coverings of different sizes. Furthermore, by evaluating a histogram after it receives most of its input, one can early remove those which cannot be the core of a tag.

The most time consuming step in modem processors is by a large factor loading data from image memory. If the processing of histograms is well synchronized with the region of the image kept in cache memory, the number of allocated histograms will be small, since only few candidates survive. Hence, all calculations involved are done within the cache limits, speeding up the image evaluation. All the other statistical calculations described below can and should be performed pixel-wise, leading to an algorithm accessing the image memory only once.

Without going into implementation details, the decoding algorithm takes as input an image containing none, one, or more REF Tags. A reader skilled in the art of image processing should be able to implement a working decoding program following the next steps:

Decode Tag Algorithm

A1. Load a JPEG image from disk or the raw image from the camera video memory, scale it down if allowed by the application goals, A2. Using a set of hierarchically organized hexagonal windows as explained above:
  a) For each window compute a hue histogram without the black and white (no-colors),
  b) Match it to the expected distribution of color (well separated, roughly equidistant hue peaks) using standard methods,
  c) If match below some threshold, remove histogram, exit.
  d) If one or more matches found, pass on the "regions of interest".

A3. For each region of interest
  e) Find hexagonal white or black cell, check candidate tag validity. If OK, continue, if not remove histogram, skip region of interest.
  f) Optional: perform white balance (find correct illumination temperature) based on the RGB data found on the white or black region.
  g) Optional: perform color calibration: find a (R'G'B')=[Calibration_Matrix](RGB) transformation matrix elements such as to minimize a cost function—least square error, for instance—between the actual and the desired signature, while keeping gamma constant.
  h) Decode the tag: generate a list of colors and their 2D (x,y) position(s).
  i) Perform error and erasure correction, if applicable. Reconstruct a color pixel, should an occlusion (erasure) occur. If two or more colors are too close (error), the system will carry on all possible cases. Rotate tag to standard position,
  j) Decode numerical key from color string along the public encoding path.

A4 Access data content related to tag's 2D code(s) from local store, server, or web-service and—if full security is required—delete that record.

A5. Perform actions required by the application. Example: overlay data over tags in the image/video stream.

Step A2 is a standard statistical test, described here only for the sake of completeness. Each pixel is stored (R, G, B) format. Transform it into a (hue, saturation, value)=(H, S, V) format. Separate colors from non-colors: given a minimal threshold for saturation, one considers everything above it as color and everything below it as black or white. Separate black from white by considering the average over the three color channel's: if that value is large, it is white, if low, it is black. For colors, compute the 6 distances of the color pixels to the reference 6 colors in sRGB co-ordinates: use a Euclidean distance definition and consider the minimum of all 6 distances. Again, should this distance be smaller than a (color-dependent) threshold, accept the pixel as belonging to the corresponding color bin. The expected prior hue distribution for a core tag A is shown in FIG. 12 and is the sum of normal distributions centred at {R, Y, G, C, B, M}. Note that Step 2 should be performed first, so that uninteresting pixels are not further processed.

After the first (raw) match with the expected distribution passes, a second test is performed while increasing the window size iteratively. Only the best match is recorded. Step A3g is a data-fitting procedure leading to small quadratic programming problem. Step A3h is unusual in that it decodes the tag in terms of a two-dimensional pattern, not of a one-dimensional sequence. Only after error estimation and corrections is the result mapped along the standard encoding path, converted into one or several integer key. These keys are eventually used to query the database which stores the linked data. Depending on the application and security restrictions, the data—or parts of it—are retrieved and consumed. For special applications, like video tracking, one can speed up the algorithm by estimating the motion of tags objects from several sequential frames and thus analyzing only the small part of the image predicted to contain the tag.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

Since the invention is subject to modifications and variations, it is intended that the above description and the accompanying drawings shall be interpreted as only illustrative of the invention defined by the following claims.

REFERENCES

Ref. 1) Chandler, Donald G., Batterman, Eric P., Shah, Govind: Hexagonal, information encoding article, process and system, U.S. Pat. No. 4,874,936, Filing date: Apr. 8, 1988, Issue date: Oct. 17, 1989; Polygonal information encoding article, process and system: Polygonal information encoding article, process and system, U.S. Pat. No. 4,896,029, Filing date: Mar. 31, 1989, Issue date: Jan. 23, 1990; U.S. Pat. No. 4,998,010, Filing date: Nov. 16, 1989, Issue date: Mar. 5, 1991

Ref. 2) Jancke, Gavin: System and method for encoding high density geometric symbol set, U.S. Pat. No. 7,936,901, Issue date, May 3, 2011

Ref. 3) http://en.wikipedia.org/wiki/Bar_codes sec also: Burke, Harry E.: *Automating Management Information Systems: Barcode Engineering and Implementation*—Thomson Learning, ISBN 0-442-20712-3; Nelson, Benjamin: *Punched Cards to Bar Codes*—Helmers Publishing, ISBN 0-911261-12-5, 434 pages Ref. 4) http://research.microsoft.com/en-us/projects/hccb/about.aspx or http://tag.microsoft.com/consumer/index.aspx Ref. 5) http://www.oligo.de Ref. 6) http://en.wikipedia.org/wiki/Graph_math see also: Biggs, N.; Lloyd, E.; Wilson, R. (1986), Graph Theory, 1736-1936, Oxford University Press Ref. 7) Fa-Yueh Wu (1982): *The Potts model*, Reviews of Modern Physics, Vo. 54, pp. 235-268

Ref. 8) http://en.wikipedia.org/wiki/Machine_learning see also Duda, Richard O., Hart, Peter E., Stork, David G. (2001) *Pattern classification* (2nd edition), Wiley, New York, ISBN 0-471-05669-3, Bishop, C. M. (1995). *Neural Networks for Pattern Recognition*, Oxford University Press. ISBN 0-19-853864-2.

Ref. 9) http://en.wikipedia.org/wiki/Bar_codes

Ref. 10) Conway, J. H. and Sloane, N. J. H. (1998) "*Sphere Packings, Lattices and Groups*" (Third Edition), ISBN 0-387-98585-9.

Ref. 11) Aste, T. and Weaire, D. "The Pursuit of Perfect Packing" (Institute Of Physics Publishing London 2000) ISBN 0-7503-0648-3.

Ref. 12) http://en.wikipedia.org/wiki/Voronoi Sec also Delaunay, B.: Sur la sphère vide, Izvestia Akademii Nauk SSSR, Otdelenic Matematicheskikh i Estestvennykh Nauk, 7:793-800, 193; Voronoi, Georgy (1907). Nouvelles applications des paramètres continus à la théoric des formes quadratiques. Journal für die Reine und Angewandte Mathcmatik, 133:97-178, 1907 Aurenhammer, Franz (1991). *Voronoi Diagrams—A Survey of a Fundamental Geometric Data Structure*. ACM Computing Surveys, 23(3):345-405, 1991.

Ref. 13) http://en.wikipedia.org/wiki/Gray_Code F. Gray. *Pulse code communication*, Mar. 17, 1953 (filed November 1947). U.S. Pat. No. 2,632,058

Ref. 14) Kohonen, T., "Self-Organization and Associative Memory", Springer Verlag, 1988, ISBN 0-387-18314-0

Ref. 15) http://en.wikipedia.org/wiki/Turbo_code. BERROU, Claude, ADDE, Patrick Procédé de décodage d'un code convolutif à maximum de vraisemblance et pondration des décisions et décodeur correspondant, Propriété Institut Télécom-Télécom Bretagne. 91 05279, Jan. 4, 1992

Ref. 16) http://en.wikipedia.org/wiki/Low-density_parity-check_code and MacKay, David J. C. "Information Theory, Inference, and Learning Algorithms", Cambridge University Press 2005, Chapter 47

Ref. 17) Appel, Kenneth; Haken, Wolfgang (1989), *Every Planar Map is Four Colorable*, AMS, p. xv, ISBN 0821851039

Ref. 18) Luby, M., Mitzenmacher, M., Shokrollahi A., Spielman. D.: "Efficient Erasure Correction Codes", *IEEE Trans. on Information Theory*, Special Issue on Codes and Graphs and iterative Algorithms, Vol. 47, No. 2, February 2001.

I claim:

1. A method for decoding one or more visual reference tags from a digitized image, each reference tag comprising an array of cells, said method comprising steps of: finding a central core of each tag using multi-scale color histograms, performing local white balancing for each tag, recovering the extent and the content of each tag, determining each tag's color sequence along an encoding path, and decoding integer numbers represented by the color sequence for each tag.

* * * * *